United States Patent [19]

Sakurai et al.

[11] Patent Number: 4,526,941

[45] Date of Patent: Jul. 2, 1985

[54] POLYMERIZATION OF OLEFINS

[75] Inventors: Hisaya Sakurai; Tadashi Ikegami; Masayoshi Miya; Katsuhiko Takaya, all of Kurashiki, Japan

[73] Assignee: Asahi Kasei Kogyo Kabushiki Kaisha, Osaka, Japan

[21] Appl. No.: 535,459

[22] Filed: Sep. 23, 1983

Related U.S. Application Data

[63] Continuation of Ser. No. 316,366, Oct. 29, 1981, abandoned.

[30] Foreign Application Priority Data

| Nov. 11, 1980 | [JP] | Japan | 55-157629 |
| Nov. 11, 1980 | [JP] | Japan | 55-157630 |
| Nov. 14, 1980 | [JP] | Japan | 55-159577 |
| Nov. 19, 1980 | [JP] | Japan | 55-161853 |

[51] Int. Cl.$^3$ .................. C08F 4/02; C08F 10/00
[52] U.S. Cl. .................. 526/127; 502/116; 502/119; 502/122; 502/123; 502/125; 502/126; 502/127; 526/124; 526/128; 526/129
[58] Field of Search .............. 526/127, 128, 129, 124; 502/114, 115, 120, 122, 123, 127, 116, 119, 125, 126

[56] References Cited

U.S. PATENT DOCUMENTS

| 4,159,963 | 7/1979 | Sakurai et al. | 526/128 |
| 4,301,029 | 11/1981 | Caunt et al. | 526/127 |
| 4,330,646 | 5/1982 | Sakurai et al. | 526/127 |
| 4,330,650 | 5/1982 | Sakurai et al. | 526/128 |
| 4,335,229 | 6/1982 | Sakurai et al. | 526/127 |

*Primary Examiner*—Edward J. Smith

*Attorney, Agent, or Firm*—Sprung Horn Kramer & Woods

[57] ABSTRACT

A process for polymerizing an α-olefin which comprises contacting the α-olefin at a temperature of about 10° C. to about 100° C. with a catalyst comprising a slurry component (A) and an organometallic component (B), the component (A) being obtained, without intermediate or final solids separation, by reacting (1) a slurry reaction mixture produced by reacting one mol of (i) a hydrocarbon-soluble organomagnesium component of the general formula $$M\alpha Mg\beta R_p^1 R_q^2 X_r Y_s$$

or of the reaction product of $M\alpha Mg\beta R_p^1 R_q^2 X_r Y_s$ with at least one electron donor selected from the group consisting of ethers, thioethers, ketones, aldehydes, carboxylic acids or derivatives thereof, alcohols, thioalcohols and amines, with 0.1 to 10 mols of (ii) a chlorosilane compound of the formula $$H_a SiCl_b R_{4-(a+b)}^{10}$$

at a temperature of about 20° C. to about 150° C., with (2) a titanium compound of the formula
$$Ti(OR^{11})_n Z_{4-n}$$

and (3) a nitrogen- or sulfur-containing heterocyclic carboxylic acid ester or a hydrocarbyl carboxylic acid ester and the mol ratio of (2) the titanium compound/(3) the carboxylic acid ester being at least 0.3.

33 Claims, No Drawings

POLYMERIZATION OF OLEFINS

This is a continuation of application Ser. No. 316,366, filed Oct. 29, 1981, now abandoned.

BACKGROUND OF THE INVENTION

1. Field of the Invention

This invention relates to highly active catalysts for highly stereospecific polymerization of α-olefins and to polymerization processes employing such catalysts. In particular, the present invention is suitable for polymerizing stereospecifically propylene, butene-1, 3-methylbutene-1, pentene-1, 4-methylpentene-1 and the like, also for copolymerizing the α-olefin with ethylene or other α-olefins, and further for polymerizing ethylene with better efficiency.

2. Description of the Prior Art

It has been well known that stereospecific polymers are produced by using a Ziegler-Natta catalyst system comprising a transition metal compound of a metal Groups IV to VIA of the Periodic Table and an organometallic compound of a metal of Groups I to III of the Periodic Table. Particularly a combination of a titanium halide and an organoaluminum compound such as triethylaluminum or diethylaluminum chloride is widely used in industrial production as a catalyst for stereospecific polymerization of α-olefins.

Polymerization of α-olefins such as propylene carried out with this type of catalysts results in a relatively high stereospecificity, which is shown by a ratio of boiling n-heptane insoluble polymers to soluble polymers, i.e., stereospecific polymers. However, the polymerization activity of the catalyst is not fully satisfactory and removal of catalyst residue from the polymer formed is necessary.

As highly active catalysts for olefin polymerization, many catalysts have been proposed which comprise an inorganic magnesium compound or organomagnesium compound and a titanium or vanadium compound or these two components plus an electron donor.

As the inorganic magnesium catalyst, for example, Polymer Letters, Vol. 3, p 855–857 (1965) describes the polymerization of propylene using a catalyst obtained by reacting magnesium chloride with titanium tetrachloride and, if necessary, adding triethylaluminum as an additive thereto. In this case, addition of an electron donor such as ethyl acetate improves the stereospecificity of the polymer formed. Further Japanese Patent Publication No. 12105/1964 describes an increase in the amount of hydrocarbon insoluble polymers in the polymers obtained when an additive such as ethyl acetate is added to the polymerization system where a combination of titanium tetrachloride-covered particles of magnesium chloride or cobalt chloride with a metal alkyl such as triethylaluminum and diethylaluminum chloride is employed as the catalyst. This Japanese Publication also describes the preparation of a novel catalyst obtained by pulverizing a metal salt such as magnesium chloride, adding a titanium tetrachloride solution to the metal salt as the support and shaking the mixture.

As another category of organomagnesium catalysts, Japanese Patent Publication No. 31968/1971 describes the polymerization of alkenes at a temperature of at least 110° C. using a catalyst obtained by adding an alkanol, an alkenol, an alkanolate, an alkenolate, a carboxylic acid, an ester or salt of a carboxylic acid, an aldehyde or a ketone before, at or after mixing an aluminum halide with a titanium compound. According to this method the stay period of time for a polymer solution in the polymerization zone is advantageously controlled within 10 minutes, preferably 5 minutes but the amount of boiling n-heptane insoluble polymers in the polymers formed is not sufficiently high. Moreover, the polymer yield per solid catalyst component is not sufficient and the polymers produced contain a high amount of a halogen atom which causes corrosion of the apparatus for producing polyolefins and the molding machines, and accordingly the properties of the products are not fully satisfactory.

According to Japanese Patent Application (OPI) Nos. 40696/1978, 70991/1978, 100986/1978, 5893/1979, 127889/1979 and 136591/1979, there have been proposed excellent catalysts for polymerizing olefins which comprise (a) a solid component obtained by contacting a hydrocarbon soluble organomagnesium component with a chlorosilane compound having a H-Si bond, a titanium compound and an electron donor and (b) an organometallic compound. Also according to Japanese Patent Application (OPI) Nos. 26905/1981, 28206/1981, 32504/1981, 47408/1981 and 5905/1981, there has been proposed the polymerization of ethylene using such catalysts, and it would be highly desirable to provide catalysts which give polymers having greater particle diameters and to further simplify the preparation method of the catalysts.

As a result of the study on the catalyst system for stereospecific polymerization of α-olefins it has now been discovered that by using, as the catalyst, a reaction mixture obtained by reacting a specific titanium compound and a specific electron donor with a reaction product having been obtained by reacting a specific organomagnesium compound with a chlorosilane compound having a Si-H bond, in combination with an organometallic compound, there can be obtained excellent catalyst suitable for polymerization of α-olefins.

SUMMARY OF THE INVENTION

According to this invention there is provided a process for polymerizing an α-olefin which comprises contacting the α-olefin at a temperature of about 10° C. to about 100° C. with a catalyst comprising a slurry component [A] and an organometallic component [B], the component [A] being obtained by adding to (1) a slurry reaction mixture produced by reacting one mol of (i) a hydrocarbon-soluble organomagnesium component of the general formula

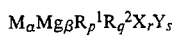

wherein
α, p, q, r and s each independently is 0 or a number greater than 0,
β is a number greater than 1,
$p+q+r+s=m\alpha+2\beta$,
m is the valence of M,
M is a metal of the 1st to 3rd groups of the Periodic Table,
$R^1$ and $R^2$ each independently is a hydrocarbon group having 1 to 20 carbon atoms,
X and Y each independently is a hydrogen atom, a halogen atom, $OR^3$, $OSiR^4R^5R^6$, $NR^7R^8$ or $SR^9$ wherein $R^3$, $R^4$, $R^5$, $R^6$, $R^7$ and $R^8$ each independently is a hydrogen atom or a hydrocarbon group having 1 to 20 carbon atoms and $R^9$ is a hydrocarbon group having 1 to 20 carbon atoms, or of the reaction product of $M_\alpha Mg_\beta R_p^1 R_q^2 X_r Y_s$ with at least one electron donor selected from the group consisting of ethers, thioethers, ketones, aldehydes, carboxylic acids or derivatives thereof, alcohols, thioalcohols and amines, with 0.1 to 10 mols of (ii) a chlorosilane compound of the formula $$H_a SiCl_b R_{4-(a+b)}^{10}$$

wherein
R$^{10}$ is a hydrocarbon group having 1 to 20 carbon atoms,
$0 < a \leq 2$ and
b is a number greater than 1
at a temperature of about 20° C. to about 150° C., with (2) a titanium compound of the formula $$Ti(OR^{11})_n Z_{4-n}$$

wherein
R$^{11}$ is a hydrocarbon group having 1 to 20 carbon atoms,
Z is a halogen atom and
$0 \leq n \leq 4$,
and (3) a nitrogen- or sulfur-containing heterocyclic carboxylic acid ester or a hydrocarbyl carboxylic acid ester and the mol ratio of (2) the titanium compound/(3) the carboxylic acid ester being at least 0.3.

One of the characteristic features of this invention is that the preparation of the catalyst is simple. In other words the reaction mixture obtained by adding catalyst reaction components is used as such and the procedures of filtration and drying can be abbreviated and formation of wastes is advantageously small. According to the method described in Japanese Patent Application (OPI) No. 127889/1979 it is necessary to separate a solid component from (1) the slurry reaction mixture produced by reacting (i) an organomagnesium component with (ii) a chlorosilane compound or a solid component from the slurry catalyst component produced by reacting (1) the slurry reaction mixture with (2) a titanium compound and/or (3) a heterocyclic carboxylic acid ester or a hydrocarbyl carboxylic acid ester. However, according to this invention, the separation of the solid components can be abbreviated, and accordingly the subsequent washing and drying procedures are unnecessary.

Another characteristic feature of this invention is that the polymer obtained is of a large particle size. This feature is remarkable in this invention and is very important from an industrial viewpoint. According to this invention the average particle diameter of the polymers obtained is, for example, as large as about 40 to about 60 mesh and further about 20 to 30 mesh as will be seen from Examples 1, 21, 41, 81, 82 and 83.

Still another characteristic feature of this invention is that the tone of color of the polymer at thermal molding is good and with high stereospecificity which is shown by boiling n-heptane insoluble residue of the polymer obtained, the catalyst efficiency can be maintained high.

DETAILED DESCRIPTION OF THE INVENTION

Each of the component materials and the reaction conditions employed for the preparation of the catalyst will be described hereinafter in detail.

The organomagnesium component (i) which can be used in preparing the slurry component [A] is represented by the general formula $$M_\alpha Mg_\beta R_p^1 R_q^2 X_r Y_s$$

wherein M, R$^1$, R$^2$, X, Y, $\alpha$, $\beta$, p, q, r and s are the same as defined above, and includes dihydrocarbyl magnesium R$_2$Mg wherein R is a hydrocarbon group and complexes of the dihydrocarbyl magnesium with other organometallic compounds.

In this formula R$^1$ and R$^2$ each independently is a hydrocarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Of these groups, alkyl groups are preferred. M is a metal of the 1st to 3rd groups of the Periodic Table. Exemplary metals represented by M include lithium, sodium, potassium, beryllium, calcium, strontium, barium, zinc, boron and aluminum. Of these metals, lithium, beryllium, boron, aluminum and zinc are preferred due to their ease of making hydrocarbon-soluble organomagnesium complexes. The atomic ratio of Mg to M, i.e., $\beta/\alpha$ may be widely varied but it is preferred to employ the hydrocarbon-soluble organomagnesium complex in which the $\beta/\alpha$ ratio is 0 to 10. It is more preferred to employ the hydrocarbon-soluble organomagnesium complex in which $\alpha > 0$ and the $\beta/\alpha$ ratio is 0.5 to 10. X and Y each independently is a hydrogen atom, a halogen atom, OR$^3$, OSiR$^4$R$^5$R$^6$, NR$^7$R$^8$ and SR$^9$ groups wherein R$^3$, R$^4$, R$^5$, R$^6$, R$^7$ and R$^8$ each independently is a hydrogen atom or a hydrocarbon group having 1 to 20 carbon atoms and R$^9$ is a hydrocarbon group having 1 to 20 carbon atoms. Exemplary hydrocarbon groups include alkyl groups such as methyl, ethyl, propyl, butyl, amyl, hexyl and decyl groups; cycloalkyl groups such as cyclohexyl group; aryl groups such as phenyl group; and aralkyl groups such as benzyl group. Exemplary halogen atoms include fluorine, chlorine, bromine and iodine and of these halogen atoms chlorine is preferred. $\alpha$, p, q, r and s each independently is 0 or a number greater than 0 and $\beta$ is a number greater than 0 and the relationship of $p + q + r + s = m\alpha + 2\beta$ wherein m is the valence of M is satisfied. This relationship shows stoichiometry between the valence of M plus Mg and the substitutents. The range of $0 \leq (r+s)/(\alpha+\beta) < 1.0$ designates that a total number of X and Y per total number of M and Mg is 0 to less than 1.0. It is preferred to employ the range of $0 \leq (r+s)/(\alpha+\beta) \leq 0.8$.

In general, organomagnesium compounds are insoluble in an inert hydrocarbon medium but organomagnesium complexes with $\alpha > 0$ are soluble in an inert hydrocarbon medium. In this invention it is essential that the organomagnesium compounds are soluble in an inert hydrocarbon medium. Also organomagnesium compounds with $\alpha = 0$ such as (sec-C$_4$H$_9$)$_2$Mg, (C$_2$H$_5$)Mg(n-C$_4$H$_9$) and (n-C$_6$H$_{12}$)$_2$Mg are soluble in an inert hydrocarbon and accordingly, can be used in this invention with good results.

The organomagnesium compounds or complexes can be prepared by reacting a compound of R$^1$MgQ or R$_2^1$Mg wherein R$^1$ is the same as defined above and Q is a halogen atom, with an organometallic compound of MR$_m^2$ or MR$_{m-1}^2$H wherein M, R$^2$ and m are the same as defined above, in an inert hydrocarbon medium such as hexane, heptane, cyclohexane, benzene and toluene at a temperature of about 0° C. to about 150° C., and, if necessary or if desired, further reacting the resulting reaction product with an alcohol, siloxane, amine, imine, thiol or a dithio compound. Furthermore, the organomagnesium compounds or complexes can be prepared by reacting a compound of $MgX_2^1$ or $R^1MgX^1$ with a compound of $MR_m^2$ or $MR_{m-1}^2H$ or by reacting a compound of $R^1MgX^1$ or $R_2^1Mg$ with a compound of $R_n^2MX_{m-n}^2$ or $X_a^1MX_{m-a}^2$ wherein M, $R^1$, $R^2$, $X^1$, $X^2$ and m are the same as defined above and a is a number of 0 to m.

A preferred example of the organomagnesium component (i) is a hydrocarbon-soluble magnesium compound of the formula $Mg\beta R_p^1 R_q^2$ which corresponds to $\alpha=0$, $r=0$ and $s=0$ in the general formula. In this invention it is necessary that the organomagnesium component (i) is soluble in the inert hydrocarbon medium. Accordingly, the hydrocarbon-soluble magnesium compound of the formula $Mg\beta R_p^1 R_q^2 X_r Y_s$ is one of the compounds shown in the following three categories:

(a) At least one of $R^1$ and $R^2$ is a secondary or tertiary alkyl group having 4 to 6 carbon atoms;

(b) $R^1$ and $R^2$ are alkyl groups having a different number of carbon atoms; and (c) at least one of $R^1$ and $R^2$ is a hydrocarbon group having 6 or more carbon atoms.

Preferred $R^1$ and $R^2$ are one of the following three combinations:

(a') $R^1$ and $R^2$ both are hydrocarbon groups having 4 to 6 carbon atoms and at least one of $R^1$ and $R^2$ is a secondary or tertiary alkyl group;

(b') $R^1$ is an alkyl group having 2 or 3 carbon atoms and $R^2$ is an alkyl group having 4 or more carbon atoms; and (c') $R^1$ and $R^2$ both are alkyl groups having 6 or more carbon atoms.

In the above described category of (a) and (a'), exemplary groups of the secondary or tertiary alkyl groups having 4 to 6 carbon atoms include sec-$C_4H_9$, tert-$C_4H_9$, $-CH(CH_3)(C_2H_5)$, $-CH(C_2H_5)_2$, $-C(C_2H_5)(CH_3)_2$, $-CH(CH_3)(C_4H_9)$, $-CH(C_2H_5)(C_3H_7)$, $-C(CH_3)_2(C_3H_7)$ and $-C(CH_3)(C_2H_5)_2$. Of these groups, secondary alkyl groups are preferred and sec-$C_4H_9$ is more preferred.

In the category of (b) and (b'), ethyl and propyl are preferred alkyl groups having 2 or 3 carbon atoms and ethyl is more preferred. Exemplary alkyl groups having 4 or more carbon atoms include butyl, amyl, hexyl and octyl. Of these alkyl groups butyl and hexyl are preferred.

In the category of (c) and (c'), exemplary hydrocarbon groups having 6 or more carbon atoms include hexyl, octyl, decyl and phenyl. Of these hydrocarbon groups, alkyl groups are preferred and hexyl is more preferred.

Thus, exemplary hydrocarbon-soluble magnesium compounds of the formula $MgR_p^1 R_q^2$ includes (sec-$C_4H_9)_2Mg$, (tert-$C_4H_9)_2Mg$, (n-$C_4H_9)Mg(C_2H_5)$, (n-$C_4H_9)Mg$(sec-$C_4H_9$), (n-$C_4H_9)Mg$(tert-$C_4H_9$), (n-$C_6H_{13})Mg(C_2H_5)$, (n-$C_8H_{17})Mg(C_2H_5)$, (n-$C_6H_{13})_2Mg$, (n-$C_8H_{17})_2Mg$ and (n-$C_{10}H_{21})_2Mg$.

Since with increased numbers of carbon atoms of the alkyl groups the organomagnesium component (i) becomes easily soluble in an inert hydrocarbon medium but the viscosity of the solution obtained tends to increase. Thus it is not advantageous from the viewpoint of ease of handling to employ unnecessarily long carbon chain alkyl groups.

The above described organomagnesium compounds can be used in the form of a solution and this solution may contain a small amount of a complexing agent such as an ether, ester or amine.

Another preferred organomagnesium component (i) is a compound of the formula $MgR_p^1 X$ which corresponds to $\alpha=0$, $\beta=1$, $q=0$, $r=1$, $s=0$ and $X=a$ halogen atom in the general formula and which is a so-called Grignard compound. Generally the Grignard compound is synthesized by reacting magnesium with an organohalide in ether solution and also in a hydrocarbon medium in the absence of ether. In this invention both methods can be employed.

Exemplary compounds of the formula $MgR_p^1 X$ include methyl magnesium chloride, methyl magnesium bromide, methyl magnesium iodide, ethyl magnesium chloride, ethyl magnesium bromide, ethyl magnesium iodide, n- or iso-propyl magnesium chloride, n- or iso-propyl magnesium bromide, n- or iso-propyl magnesium iodide, n-butyl magnesium chloride, n-butyl magnesium bromide, n-butyl magnesium iodide, iso-, sec- or tert-butyl magnesium chloride, iso-, sec- or tert-butyl magnesium bromide, iso-, sec- or tert-butyl magnesium iodide, n-amyl magnesium chloride, n-amyl magnesium bromide, hexyl magnesium chloride, hexyl magnesium bromide, octyl magnesium chloride, phenyl magnesium chloride, phenyl magnesium bromide and ether complexes with one of these compounds. Such ethers forming the complexes include dimethyl ether, diethyl ether, diisopropyl ether, dibutyl ether, diallyl ether, tetrahydrofuran, dioxane and anisole.

In the present invention the hydrocarbon soluble-organomagnesium component (i) may be used as such, as the reaction agent to be reacted with a chlorosilane compound (ii). The reaction product of the organomagnesium component (i) and an electron donor may also be used.

The electron donors which can be employed in this invention include ethers, thioethers, ketones, aldehydes, carboxylic acids or derivatives thereof, alcohols, thioalcohols and amines which are well known compounds as the electron donor.

The ethers are represented by the general formula $R^{12}OR^{13}$ wherein $R^{12}$ and $R^{13}$ each is an aliphatic, aromatic or alicyclic hydrocarbon group having 1 to about 20 carbon atoms. Exemplary groups are methyl, ethyl, propyl, butyl, amyl, hexyl, decyl, octyl, dodecyl, cyclohexyl, phenyl and benzyl groups.

The thioethers are represented by the general formula $R^{14}SR^{15}$ wherein $R^{14}$ and $R^{15}$ each is an aliphatic, aromatic or alicyclic hydrocarbon group having 1 to about 20 carbon atoms. Exemplary groups are methyl, ethyl, propyl, butyl, amyl, hexyl, cyclohexyl and phenyl groups.

The ketones are represented by the general formula $R^{16}COR^{17}$ wherein $R^{16}$ and $R^{17}$ each is an aliphatic, aromatic or alicyclic hydrocarbon group having 1 to about 20 carbon atoms. Exemplary groups are methyl, ethyl, propyl, butyl, amyl, hexyl, cyclohexyl and phenyl groups, and dimethyl ketone and diethyl ketone are especially preferred.

The aldehydes are represented by the general formula $R^{18}CHO$ wherein $R^{18}$ is an aliphatic, aromatic or alicyclic hydrocarbon group having 1 to about 20 carbon atoms. Exemplary groups are methyl, ethyl, propyl, butyl, hexyl, cyclohexyl and phenyl groups.

The hydrocarbyl carboxylic acids or derivatives thereof are aliphatic, alicyclic and aromatic, saturated and unsaturated carboxylic acids where the number of carbon atoms of the carboxylic acids can vary widely and is preferably 1 to about 20, there acid anhydrides, their esters, their acid halides and their acid amides. Exemplary hydrocarbyl carboxylic acids include formic acid, acetic acid, propionic acid, butyric acid, valeric acid, oxalic acid, malonic acid, succinic acid, maleic acid, acrylic acid, benzoic acid, toluic acid and terephthalic acid. Exemplary hydrocarbyl carboxylic acid anhydrides include acetic anhydride, propionic anhydride, n-butyric anhydride, succinic anhydride, maleic anhydride, benzoic anhydride and phthalic anhydride. In the hydrocarbyl carboxylic acid esters, it is preferred that the alcohol of the ester group has 1 to about 20 carbon atoms. Exemplary hydrocarbyl carboxylic acid esters include methyl or ethyl formate, methyl, ethyl or propyl acetate, methyl, ethyl, propyl or butyl propionate, ethyl butyrate, ethyl valerate, ethyl caproate, ethyl n-heptanoate, dibutyl oxalate, ethyl succinate, ethyl malonate, dibutyl maleate, methyl or ethyl acrylate, methyl methacrylate, methyl, ethyl, propyl or butyl benzoate, methyl, ethyl, propyl, butyl or amyl toluate, methyl, or ethyl p-ethylbenzoate, methyl, ethyl, propyl or butyl anisate and methyl or ethyl p-ethoxybenzoate. The hydrocarbyl carboxylic halides are preferably the carboxylic chlorides including, for example, acetyl chloride, propionyl chloride, butyryl chloride, succinoyl chloride, benzoyl chloride and toluyl chloride. Exemplary hydrocarbyl carboxylic acid amides include dimethyl formamide, dimethyl acetamide and dimethyl propionamide.

The alcohols are aliphatic, aromatic, alicyclic alcohols having 1 to about 20 carbon atoms. Exemplary alcohols include methyl alcohol, ethyl alcohol, propyl alcohol, butyl alcohol, amyl alcohol, hexyl alcohol, phenol and cresol. It is preferred to use sec- or tert-alcohols or aromatic alcohols including sec-propyl alcohol, sec-butyl alcohol, tert-butyl alcohol, sec-amyl alcohol, tert-amyl alcohol, sec-hexyl alcohol, phenol and o-, m- or p-cresol.

The thioalcohols are aliphatic, aromatic or alicyclic alcohols having 1 to about 20 carbon atoms. Exemplary thioalcohols include methyl mercaptan, ethyl mercaptan, propyl mercaptan, butyl mercaptan, amyl mercaptan, hexyl mercaptan and phenyl mercaptan. It is preferred to use sec-, tert- or aromatic thioalcohols.

The amines are aliphatic, alicyclic or aromatic amines having 1 to about 20 carbon atoms. It is preferred to use sec- or tert-amines including trialkylamines, triphenylamine and pyridine.

The reaction between the hydrocarbon soluble organomagnesium component (i) and the electron donor is conducted in an inert reaction medium such as aliphatic hydrocarbons including hexane and heptane; aromatic hydrocarbons including benzene, toluene and xylene; alicyclic hydrocarbons including cyclohexane and methylcyclohexane; ethers; and any mixtures thereof.

The reaction order of these compounds is optional. For example, the electron donor is added to the organomagnesium component (i), or vice versa, or both components are simultaneously added to a reaction zone. In these reactions, the amount of the electron donor is not particularly limited, but preferably is at most about 1 mol, more preferably in the range of about 0.01 to about 0.8 mol, most preferably about 0.05 to about 0.5 mol per mol of the organomagnesium component (i).

The above described organomagnesium component (i) or the reaction product of the organomagnesium component (i) with the electron donor is used to produce the slurry reaction solid (1) by reaction with a chlorosilane compound (ii) having a Si-H bond, represented by the formula $H_aSiCl_bR^{10}_{4-(a+b)}$.

In the formula, a, b and $R^{10}$ have the same meanings as described above, and the hydrocarbon groups represented by $R^{10}$ have 1 to 20 carbon atoms and include aliphatic, alicyclic or aromatic hydrocarbon groups such as methyl, ethyl, propyl, butyl, amyl, hexyl, decyl, cyclohexyl and phenyl. Preferred hydrocarbon groups are alkyl groups having 1 to 10 carbon atoms, and lower alkyl groups such as methyl, ethyl, propyl are more preferred. The range of a and b is typically $0 < a \leq 2$, $b > 0$ and $a+b \leq 4$. A preferred range of a and b is $0.5 \leq a \leq 1.5$, $b > 1$ and $a+b \leq 4$.

Exemplary chlorosilane compounds include $HSiCl_3$, $HSiCl_2(CH_3)$, $HSiCl_2(C_2H_5)$, $HSiCl_2(n-C_3H_7)$, $HSiCl_2(i-C_3H_7)$, $HSiCl_2(n-C_4H_9)$, $HSiCl_2(C_6H_5)$, $HSiCl_2(4-Cl-C_6H_4)$, $HSiCl_2(CH=CH_2)$, $HSiCl_2(CH_2C_6H_5)$, $HSiCl_2(1-C_{10}H_7)$, $HSiCl_2(CH_2CH=CH_2)$, $H_2SiCl(CH_3)$, $H_2SiCl_2(C_2H_5)$, $HSiCl(CH_3)_2$, $HSiCl(CH_3)(i-C_3H_7)$, $HSiCl(CH_3)(C_6H_5)$, $HSiCl(C_2H_5)_2$ and $HSiCl(C_6H_5)_2$. This compound alone, a mixture of these compounds or a mixture partially containing any of these compounds may be used. Preferred chlorosilane compounds are trichlorosilane, monomethyldichlorosilane, dimethylchlorosilane and ethyldichlorosilane. More preferred chlorosilane compounds are trichlorosilane and monomethyldichlorosilane.

The reaction between the organomagnesium component (i) and the chlorosilane compound (ii) is conducted in an inert reaction medium such as aliphatic hydrocarbons such as hexane and heptane; aromatic hydrocarbons such as benzene, toluene and xylene; alicyclic hydrocarbon such as cyclohexane and methyl cyclohexane; ethers such as ether and tetrahydrofuran; and mixtures thereof. Of these reaction media, aliphatic hydrocarbons are preferred from the point of catalyst performance. The reaction temperature is not particularly limited and typically ranges from about 20° C. to about 150° C. From the point of reaction rate, the reaction is preferably carried out at least at about 40° C. The ratio of the two components is not particularly limited but it is preferred to use about 0.1 to 10 mols, more preferably about 0.2 to 5 mols of the chlorosilane compound (ii) per mol of magnesium in the organomagnesium component (i).

As to the manner of the reaction, it can involve (a) simultaneously introducing the two components (i) and (ii) into a reaction zone, (b) previously charging the chlorosilane compound (ii) into the reaction zone, then introducing the organomagnesium component (i) to the reaction zone to react therein, or (c) previously charging the organomagnesium component (i), then introducing the chlorosilane compound (ii). The latter two methods (b) and (c) are preferred, with the method (b) providing particularly good results.

Further, in order to increase the size of the polymer particles obtained it is preferred that the reaction between the organomagnesium component (i) and the chlorosilane compound (ii) is conducted in the presence of an inorganic oxide. This effect is remarkable when (i) the hydrocarbon-soluble organomagnesium component or the reaction product of the hydrocarbon-soluble organomagnesium component with at least one electron donor contains OR³ group or OSiR⁴R⁵R⁶ group.

Exemplary inorganic oxides include silica, silica-alumina, alumina and magnesia. Of these inorganic oxides, silica and silica-alumina are preferred.

The amount of the inorganic oxide which can be employed is typically 10 g to 10 Kg, preferably 20 g to 5 Kg per mol of the hydrocarbon-soluble organomagnesium component or the reaction product of the hydrocarbon-soluble organomagnesium component with at least one electron donor.

In the present invention the slurry component [A] can be obtained by reacting (2) a titanium compound and (3) a nitrogen- or sulfur-containing heterocyclic carboxylic acid ester or a hydrocarbyl carboxylic acid ester with (1) the slurry reaction mixture as such obtained by reacting the organomagnesium component (i) with the chlorosilane compound (ii) without going through filtration and washing.

Details will now be given of the titanium compound (2) of the formula $$Ti(OR^{11})_n Z_{4-n}$$

wherein
$0 \leq n \leq 4$
$R^{11}$ is a hydrocarbon group having 1 to 20 carbon atoms and
Y is a halogen atom.

$R^{11}$ in this formula is an aliphatic, alicyclic or aromatic hydrocarbon group. Exemplary groups include methyl, ethyl, propyl, butyl, amyl, hexyl, heptyl, octyl, nonyl, decyl, cetyl, stearyl, 2-ethylhexyl, cyclopentyl, cyclohexyl, phenyl, cresyl and naphthyl. Exemplary halogen atoms include chlorine, bromine and iodine, and of these halogen atoms, chlorine is preferred.

The titanium compound which can be employed is a titanium halide which corresponds to $0 \leq n < 4$. Such titanium halides include, for example, titanium halides, titanium alkoxyhalides and mixtures thereof such as titanium tetrachloride, titanium tetrabromide, titanium tetraiodide, ethoxytitanium trichloride, propoxytitanium trichloride, butoxytitanium trichloride, dibutoxytitanium dichloride and tributoxytitanium monochloride. Preferred titanium halides have at least three halogen atoms and titanium tetrachloride is more preferred.

The titanium compound which can also be employed is a titanium alkoxide which corresponds to n=4. Such titanium alkoxides include, for example, Ti(OCH₃)₄, Ti(OC₂H₅)₄, Ti(On-C₃H₇)₄, Ti(Oiso-C₃H₇)₄, Ti(On-C₄H₉)₄, Ti(Osec-C₄H₉)₄, Ti(Oiso-C₄H₉)₄, Ti(Otert-C₄H₉)₄, Ti(On-C₅H₁₁)₄, Ti(Otert-C₅H₁₁)₄, Ti(On-C₆H₁₃)₄, Ti(On-C₇H₁₅)₄, Ti(On-C₈H₁₇)₄, Ti(Oiso-C₅H₁₁)₄, Ti(On-C₉H₁₉)₄, Ti(On-C₁₀H₂₁)₄, Ti(On-C₁₆H₃₃)₄, Ti(On-C₁₈H₃₇)₄, Ti(OC₈H₁₇)₄ [titanium 2-ethyl hexoide], Ti(OC₆H₁₁)₄, Ti(OC₆H₅)₄, Ti(OC₆H₄CH₃)₄, Ti(OC₁₀H₇)₄ and mixtures thereof.

Details will now be given of the nitrogen-containing heterocyclic carboxylic acid ester, sulfur-containing heterocyclic carboxylic acid ester and hydrocarbyl carboxylic acid ester.

Exemplary nitrogen-containing heterocyclic carboxylic acid esters include pyrrolcarboxylic acid esters, indolecarboxylic acid esters, carbazolecarboxylic acid esters, oxazolecarboxylic acid esters, thiazolecarboxylic acid esters, imidazolecarboxylic acid esters, pyrazolecarboxylic acid esters, pyridinecarboxylic acid esters, phenanthridinecarboxylic acid esters, anthrazolinecarboxylic acid esters, phenanthrolinecarboxylic acid esters, naphthylidinecarboxylic acid esters, oxadinecarboxylic acid esters, thiazinecarboxylic acid esters, pyridazinecarboxylic acid esters, pyrimidinecarboxylic acid esters and pyrazinecarboxylic acid esters. Exemplary preferred compounds are pyrrol-2-carboxylic acid methyl, ethyl, propyl or butyl ester, pyrrol-3-carboxylic acid methyl, ethyl, propyl or butyl ester, pyridine-2-carboxylic acid methyl, ethyl, propyl, butyl or amyl ester, pyridine-3-carboxylic acid methyl, ethyl, propyl, butyl or amyl ester, pyridine-4-carboxylic acid methyl, ethyl, propyl, butyl or amyl ester, pyridine-2,3-dicarboxylic acid methyl or ethyl ester, pyridine-2,5-dicarboxylic acid methyl or ethyl ester, pyridine-2,6-dicarboxylic acid methyl or ethyl ester, pyridine-3,5-dicarboxylic acid methyl or ethyl ester, quinoline-2-carboxylic acid methyl or ethyl ester, dimethylpyrrolcarboxylic acid ethyl ester, N-methylpyrrolcarboxylic acid ethyl ester, 2-methylpyridinecarboxylic acid ethyl ester, piperidine-2-carboxylic acid ethyl ester, piperidine-4-carboxylic acid ethyl ester and pyrrolidine-2-carboxylic acid ethyl ester.

Exemplary sulfur-containing heterocyclic acid esters include thiophenecarboxylic acid esters, thianaphthene carboxylic acid esters, isothianaphthene carboxylic acid esters, benzothiophene carboxylic acid esters, phenoxathiin carboxylic acid esters, benzothiane carboxylic acid esters, thiaxanthene carboxylic acid esters, thioindoxyl carboxylic acid esters and the like. Exemplary preferred compounds are thiophene-2-carboxylic acid methyl, ethyl, propyl, butyl or amyl ester, thiophene-3-carboxylic acid methyl, ethyl, propyl, butyl or amyl ester, thiophene-2,3-dicarboxylic acid methyl or ethyl ester, thiophene-2,4-dicarboxylic acid methyl or ethyl ester, thiophene-2,5-dicarboxylic acid methyl or ethyl ester, 2-thienylacetic acid methyl, ethyl, propyl or butyl ester, 2-thienylacrylic acid methyl or ethyl ester, 2-thienylpyruvic acid methyl or ethyl ester, thianaphthene-2-carboxylic acid methyl or ethyl ester, thianaphthene-3-carboxylic acid methyl or ethyl ester, 3-oxy-2-thianaphthenecarboxylic acid methyl or ethyl ester, thianaphthene-2,3-dicarboxylic acid methyl or ethyl ester, 2-thianaphthenylacetic acid methyl or ethyl ester, 3-thianaphthenylacetic acid methyl or ethyl ester, benzothiophene-2-carboxylic acid methyl or ethyl ester, benzothiophene-3-carboxylic acid methyl or ethyl ester, benzothiophene-4-carboxylic acid methyl or ethyl ester, phenoxathiin-1-carboxylic acid methyl or ethyl ester, phenoxathiin-2-carboxylic acid methyl or ethyl ester and phenoxathiin-3-carboxylic acid methyl or ethyl ester. Of these compounds, more preferred compounds include thiophene-2-carboxylic acid methyl or ethyl ester, 2-thienylacetic acid methyl or ethyl ester, 2-thienylacrylic acid methyl or ethyl ester and thianaphthene-2-carboxylic acid methyl or ethyl ester.

Exemplary hydrocarbyl carboxylic acid esters include ethyl formate, methyl acetate, ethyl acetate, n-propyl acetate, ethyl propionate, ethyl butyrate, ethyl valerate, ethyl capronate, ethyl n-heptanoate, di-n-butyl oxalate, monoethyl succinate, diethyl succinate, ethyl malonate, di-n-butyl malate, methyl acrylate, ethyl acrylate, methyl methacrylate, methyl benzoate, ethyl benzoate, n- or iso-propyl benzoate, n-, iso-, sec- or tert-butyl benzoate, methyl p-toluate, ethyl p-toluate, n- or iso-propyl p-toluate, n- or iso-amyl p-toluate, ethyl o-toluate, ethyl m-toluate, methyl p-ethylbenzoate, ethyl o-ethylbenzoate, methyl anisate, ethyl anisate, n- or isopropyl anisate, methyl p-ethoxybenzoate, ethyl p-ethoxybenzoate, methyl terephthalate and the like. Of these compounds, preferred are methyl benzoate, ethyl benzoate, methyl p-toluate, ethyl p-toluate, methyl anisate and ethyl anisate.

Details will now be provided of the reaction of (1) the slurry reaction mixture with (2) the titanium compound and (3) the nitrogen- or sulfur-containing heterocyclic carboxylic acid ester or the hydrocarbyl carboxylic acid ester.

The solid component is formed in (1) the slurry reaction mixture produced by reacting (i) the hydrocarbon-soluble organomagnesium component with (ii) the chlorosilane compound, and it is preferred that after completion of the reaction of (i) and (ii), the titanium compound (2) and the nitrogen- or sulfur-containing heterocyclic carboxylic acid ester or the hydrocarbyl carboxylic acid (3) are added to the slurry reaction mixture (1) to react with the solid component.

The amount of the titanium compound (2) which can be employed is typically $3 \leq Mg/Ti \leq 500$, preferably $10 \leq Mg/Ti \leq 100$, and it is preferred that the concentration of titanium in the reaction solution is at most 4 mols per liter of an inert reaction medium.

The reaction temperature employed is not particularly limited and it is preferred from the viewpoint of reaction rate to employ a temperature of about 50° C. to about 150° C.

The mol ratio of the titanium compound (2)/the nitrogen- or sulfur-containing heterocyclic carboxylic acid or the hydrocarbyl carboxylic acid (3) which can be employed is typically at least 0.3 and up to 10, preferably 0.4 to 5, and it is preferred that the concentration of the nitrogen- or sulfur-containing heterocyclic carboxylic acid or the hydrocarbyl carboxylic acid (3) is at most 5 mols per liter of an inert reaction medium.

The reaction temperature employed is typically about 40° C. to about 160° C., preferably about 50° C. to 150° C.

As to the manner of the reaction, the nitrogen- or sulfur-containing heterocyclic carboxylic acid ester or the hydrocarbyl carboxylic acid ester (3) may be introduced into a reaction zone before, at the time of or after addition of the titanium compound (2) to the slurry reaction mixture (1). The former two methods are preferred. When the nitrogen- or sulfur-containing heterocyclic carboxylic acid ester or the hydrocarbyl carboxylic acid ester (3) and the titanium compound (2) are simultaneously added to the slurry mixture (1), the reaction temperature employed is typically about 40° C. to about 160° C., preferably about 50° C. to 150° C.

The organometallic compounds which can be employed as the organometallic component [B] are compounds of metals of the 1st to 3rd groups of the Periodic Table and include organoaluminum compounds, organomagnesium compounds and organozinc compounds. Of these organometallic compounds, organoaluminum compounds are preferred.

Exemplary organoaluminum compounds include trialkylaluminums such as trimethylaluminum, triethylaluminum, tri-n-propylaluminum, triisopropylaluminum, tri-n-butylaluminum, triisobutylaluminum, tri-n-hexylaluminum, tri-n-octylaluminum, tri-n-decylaluminum, tri-n-dodecylaluminum, trihexadecylaluminum and aluminum isoprenyl; organoaluminum compounds having at least two aluminum atoms bonded through an oxygen atom or a nitrogen atom such as $(C_2H_5)_2Al-O-Al(C_2H_5)_2$ and

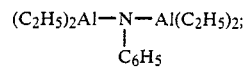

alkylaluminum halides such as dimethylaluminum chloride, diethylaluminum chloride, di-n-propylaluminum chloride, di-n-butylaluminum chloride, diisobutylaluminum chloride, di-n-hexylaluminum chloride, diisohexylaluminum chloride, di(2-ethylhexyl)aluminum chloride, di-n-dodecylaluminum chloride, methylisobutylaluminum chloride, ethylisobutylaluminum chloride, methylaluminum sesquichloride, ethylaluminum sesquichloride, isobutylaluminum sesquichloride, methylaluminum dichloride, ethylaluminum dichloride, isobutylaluminum dichloride, diethylaluminum bromide; and dialkylaluminum hydrides such as diethylaluminum hydride and diisobutylaluminum hydride. Of these organoaluminum compounds, trialkylaluminums and dialkylaluminum hydrides are preferred.

The slurry catalyst component [A] and the organometallic component [B] may be added under the polymerization conditions to the polymerization system or may be combined prior to the polymerization.

The mixing ratio of the slurry catalyst component [A] and the organometallic component [B] is regulated by the mol ratio of M in the component [A] plus the metal M' in the component [B] to Ti in the component [A], i.e., (M+M')/Ti. The mol ratio of (M+M')/Ti typically ranges from about 3/1 to about 1000/1.

The present invention relates to highly active catalysts for highly stereospecific polymerization of olefins. Especially the present invention is suitable for polymerizing stereoregularly propylene, butene-1, pentene-1, 4-methylpentene-1, 3-methylbutene-1 and the like. Also it is suitable for copolymerizing the α-olefins with ethylene or other α-olefins. Further it is suitable for polymerizing ethylene with better efficiency. It is also possible in the present invention to add hydrogen, a halogenated hydrocarbon or an organometallic compound which is liable to cause chain transfer in accordance with the conventional methods in order to control the molecular weight of the polymer.

As to the manner of polymerization, the conventionally employed suspension polymerization, bulk polymerization in liquid monomers or gas phase polymerization may be employed. The suspension polymerization may be carried out at a temperature of about 10° C. to about 100° C. by introducing the catalyst together with a polymerization medium e.g., an aliphatic hydrocarbon such as hexane or heptane, an aromatic hydrocarbon such as benzene, toluene or xylene, or an alicyclic hydrocarbon such as cyclohexane or methylcyclohexane, and introducing an olefin such as propylene under a pressure of about 1 to about 20 kg/cm² in an inert atmosphere. The bulk polymerization may be carried out under the conditions where an olefin such as propylene is in the liquid state using the catalyst and the liquid olefin as a polymerization medium. For example, propylene can be polymerized in liquid propylene at a temperature of about 10° C. to about 100° C. On the other hand, the gas phase polymerization can be carried out, e.g., under a pressure of about 1 to about 50 kg/cm² and at a temperature of about 10° C. to about 100° C. in the absence of a reaction medium by means of a fluidized bed, a movable bed or a mechanical stirrer so that the olefin such as propylene and the catalyst can be well contacted.

The present invention will now be illustrated in greater detail with reference to several Examples, but they are given for illustrative purposes only and are not to be construed as limiting the invention.

In these examples "boiling n-heptane extraction residue" means the residue obtained by extracting a polymer with boiling n-heptane for 6 hours, and "mesh" is measured according to JIS Z8801-1966.

EXAMPLE 1

(I) Synthesis of Hydrocarbon-soluble Organomagnesium Component (i)

In a 1 l flask having been purged with nitrogen were charged 69 g of di-n-butylmagnesium chloride and 9.5 g of triethylaluminum together with 500 ml of n-heptane; and the mixture was stirred at 80° C. for 2 hours to give an organomagnesium complex solution. As a result of analysis, the composition of this complex was $AlMg_{6.0}(C_2H_5)_{3.1}(n-C_2H_9)_{11.9}$ and the concentration of the organometal was 1.30 mols per liter of the reaction solvent.

(II) SYNTHESIS OF SLURRY COMPONENT [A]

In a 1 l flask having been sufficiently dried was charged 500 mmols of heptane solution containing trichlorosilane ($HSiCl_3$) in an amount of 1 mol per liter of n-heptane, and then 250 mmols of the organomagnesium complex solution as obtained above and 100 ml of n-heptane were added dropwise thereto at 70° C. over one hour, and further the reaction was continued with stirring at 70° C. for one hour. To the reaction mixture was added 31.6 mmols of thiophene-2-carboxylic acid ethyl ester as a n-hexane solution containing 1 mol of thiophene-2-carboxylic acid etyl ester per liter of n-hexane at 70° C. and the mixture was stirred at 70° C. for one hour and then 16.8 mmols of $TiCl_4$ was added thereto and the reaction was conducted with stirring at 70° C. for one hour.

(III) SLURRY POLYMERIZATION OF PROPYLENE

In a 3 l autoclave have been sufficiently dried were charged the slurry component [A] as obtained above in an amount of 0.040 mg-atom per Ti and 0.2 mmol of triethylaluminum together with 2 l of n-hexane. While the inner temperature of the autoclave was being maintained at 60° C., propylene was pressurized to 5.0 Kg/cm² so that a total gauge pressure of 4.8 Kg/cm² could be achieved. Polymerization was carried out for two hours while maintaining the total gauge pressure by supplying additional ethylene. As a result, there were obtained 300 g of a n-hexane insoluble polymer and 13.3 g of a n-hexane soluble polymer and the catalyst efficiency was 157,000 g-PP/g-Ti and the residue after the n-hexane insoluble polymer was extracted with boiling n-heptane was 92.5% and its average particle diameter was about 40 mesh. The result of sieving is shown in TABLE 1.

For comparison Example 3 of Japanese Patent Application (OPI) No. 127889/1979 was repeated and the result of sieving the polypropylene obtained is also shown in TABLE 1.

TABLE 1

| Mesh | This Invention (Weight %) | Example 3 of Japanese Pat. Appln. (OPI) No. 127889/1979 (Weight %) |
|---|---|---|
| 10 | 0 | 0 |
| 14 | 0.5 | 0 |
| 20 | 3.0 | 0 |
| 28 | 10.1 | 1.0 |
| 35 | 26.5 | 2.5 |
| 48 | 30.3 | 8.0 |
| 70 | 18.7 | 27.0 |
| 100 | 7.5 | 28.8 |
| 150 | 2.5 | 24.2 |
| 200 | 0.4 | 6.0 |
| 280 | 0 | 2.0 |
| >280 | 0 | 1.0 |

(IV) BULK POLYMERIZATION OF PROPYLENE

In an autoclave were charged the slurry component [A] as obtained above in an amount of 0.040 mg-atom per Ti, 0.2 mmol of triethylaluminum and 10 mmols of hydrogen and then 2.5 l of liquid propylene was introduced therein. Polymerization was conducted for two hours with stirring while the inner temperature of the autoclave was being maintained at 65° C. As a result, there was obtained 913 g of polypropylene powder and the n-heptane extraction residue was 94.4%.

EXAMPLES 2 TO 15

The same slurry polymerization as in Example 1 was repeated except that the catalyst obtained by employing the catalyst components as set forth in TABLES 2 and 3 in its preparation was used. The results are shown in TABLE 3.

TABLE 2

| | Slurry Catalyst Component [A] | | |
|---|---|---|---|
| | Slurry Reaction Mixture (1) | | |
| Example No. | Hydrocarbon Soluble Organomagnesium Component (i) (mmol) | Chlorosilane Compound (ii) (mmol) | (i) + (ii) Reaction Conditions Temperature (°C.) × Time (hour) |
| 2 | $AlMg_{6.0}(n-C_5H_{11})_{14.8}[N(C_2H_5)_2]_{0.2}$ 250 | $HSiCl_2(CH_3)$ 500 | 65 × 2 |
| 3 | $AlMg_{4.0}(n-C_4H_9)_7(On-6H_{13})_4$ 250 | $HSiCl_3$ 600 | " |
| 4 | $Al_2Mg(C_2H_5)_{7.7}(SC_6H_5)_{0.3}$ 250 | $HSiCl_3$ 400 | " |
| 5 | $(sec-C_6H_{13})_{1.7}Mg[OSiH(CH_3)_2]_{0.3}$ 250 | $HSiCl_2(C_2H_5)$ 450 | 68 × 2 |
| 6 | $(i-C_3H_7)Mg(n-C_9H_9)$ 250 | $HSiCl_2(n-C_3H_7)$ 350 | " |
| 7 | $(C_2H_5)_{0.8}Mg(n-C_9H_9)_{0.8}(OC_2H_5)_{0.4}$ 250 | $HSiCl_3$ 460 | 65 × 2 |
| 8 | $ZnMg_2(C_2H_5)_2(n-C_6H_{13})_4$ 250 | $HsiCl_2(CH_3)$ 200 | 70 × 2 |

TABLE 2-continued

Slurry Catalyst Component [A]

| | | | |
|---|---|---|---|
| 9 | BeMg(C₂H₅)₂(CH₂C₆H₅)₂ 250 | HSiCl₂(CH₃) 400 | 70 × 2 |
| 10 | BMg₃(n-C₄H₉)₈[OSiH(CH₃)(C₄H₉)] 250 | HSiCl₃ 300 | 65 × 2 |
| 11 | LiMg₉(sec-C₄H₉)₉(n-C₄H₉)₁₀ 250 | HSiCl₃ 400 | " |
| 12 | AlMg₆(C₂H₅)₃(n-C₈H₁₇)₁₂ 250 | HSiCl₃ 380 | " |
| 13 | (n-C₄H₉)Mg(sec-C₄H₉) 250 | HSiCl₃ 500 | " |
| 14 | n-C₄H₉MgCl·(n-C₄H₉)₂O 250 | HSiCl₂(CH₃) 390 | " |
| 15 | (n-C₄H₉)MGCl (ether solution) | HSiCl₃ 450 | " |

| Example No. | Titanium Compound (2) (mmol) | (1) + (2) Reaction Conditions Temperature (°C.) × Time (hour) | Heterocyclic Carboxylic Acid Ester (3) (mmol) | [(1) + (2)] + (3) Reaction Conditions Temperature (°C.) × Time (hour) |
|---|---|---|---|---|
| 2 | TiCl₃(On-C₄H₉) 16.3 | 60 × 1 | Pyridine-3-carboxylic acid ethyl ester 30 | 60 × 1 |
| 3 | TiCl₂(On-C₃H₇)₂ 16.0 | 55 × 1 | Pyridine-2-carboxylic acid methyl ester 30 | " |
| 4 | TiCl(On-C₄H₉)₃ 16.0 | 60 × 1 | Pyridine-4-carboxylic acid ethyl ester 31 | " |
| 5 | TiCl₄ 16.9 | " | Pyrrol-2-carboxylic acid ethyl ester 33 | " |
| 6 | TiCl₄ 13.0 | " | N—Carboethoxy pyrrol 30 | " |
| 7 | TiCl₄ 16.7 | " | Thiophene-2-carboxylic acid methyl ester 35 | 65 × 1 |
| 8 | TiCl₄ 14.1 | " | Thiophene-2-carboxylic acid ethyl ester 31 | " |
| 9 | TiCl₄ 13.0 | " | Thiophene-2-carboxylic acid n-butyl ester 44 | 60 × 1 |
| 10 | TiCl₄ 12.8 | 55 × 1 | Thiophene-2-carboxylic acid ethyl ester 31 | " |
| 11 | TiCl₄ 16.0 | " | Thiophene-3-carboxylic acid ethyl ester 33 | " |
| 12 | TiCl₄ 12.0 | " | Thiophene-2-carboxylic acid ethyl ester 30 | " |
| 13 | TiCl₄ 10.7 | " | Thiophene-2-carboxylic acid ethyl ester 30 | " |
| 14 | TiCl₄ 11.4 | " | Thiophene-2-carboxylic acid ethyl ester 24 | " |
| 15 | TiCl₄ 12.7 | " | Thiophene-2-carboxylic acid ethyl ester 31 | " |

TABLE 3

Result of Polymerization

| Example No. | Organometallic Component [B] (mmol) | n-Hexane Insoluble Polymer Yield (g) | Boiling n-Heptane Extraction Residue (%) | Catalyst Efficiency g-PP/g-Ti | n-Hexane Soluble Polymer (g) |
|---|---|---|---|---|---|
| 2 | Al(C₂H₅)₃ 0.20 | 275 | 92.7 | 144,000 | 12.5 |
| 3 | Al(C₂H₅)₃ 0.20 | 270 | 91.1 | 141,000 | 12.7 |
| 4 | Al(C₂H₅)₃ 0.20 | 280 | 90.3 | 146,000 | 14.2 |
| 5 | Al(C₂H₅)₃ 0.20 | 303 | 91.7 | 158,000 | 11.0 |
| 6 | Al(C₂H₅)₃ 0.20 | 305 | 92.5 | 159,000 | 13.0 |
| 7 | Al(i-C₄H₉)₃ 0.20 | 328 | 92.9 | 171,000 | 15.2 |
| 8 | Al(i-C₄H₉)₃ 0.20 | 288 | 93.0 | 150,000 | 10.0 |
| 9 | Al(n-C₃H₇)₃ 0.20 | 295 | 89.3 | 154,000 | 16.2 |
| 10 | Al(C₂H₅)₂H Al(C₂H₅)₃ 0.20 | 263 | 90.5 | 137,000 | 9.5 |

TABLE 3-continued

| | | Result of Polymerization | | | |
|---|---|---|---|---|---|
| | | n-Hexane Insoluble Polymer | | | |
| Example No. | Organo-metallic Component [B] (mmol) | Yield (g) | Boiling n-Heptane Extraction Residue (%) | Catalyst Efficiency g-PP/g-Ti | n-Hexane Soluble Polymer (g) |
| 11 | 0.1 + 0.1 Al($C_2H_5$)$_3$ 0.20 | 285 | 92.2 | 149,000 | 13.7 |
| 12 | Al($C_2H_5$)$_3$ 0.20 | 305 | 93.5 | 159,000 | 11.4 |
| 13 | Al($C_2H_5$)$_3$ 0.20 | 298 | 93.8 | 155,000 | 12.5 |
| 14 | Al($C_2H_5$)$_3$ 0.20 | 275 | 92.9 | 144,000 | 11.5 |
| 15 | Al($C_2H_5$)$_3$ 0.20 | 268 | 90.3 | 140,000 | 12.7 |

EXAMPLES 16 TO 19

Polymerization of the α-olefins as set forth in TABLE 4 was carried out by using the same catalyst as in Example 1 in the same manner as in Example 1. The results are shown in TABLE 4.

TABLE 4

| Example No. | α-Olefin | Polymer Yield (g) | Color |
|---|---|---|---|
| 16 | Butene-1 | 34 | white |
| 17 | 4-Methylpentene-1 | 30 | white |
| 18 | Propylene containing 2 mol % of ethylene | 148 | white |
| 19 | Propylene containing 2 mol % of butene-1 | 140 | white |

EXAMPLE 20

In a 3 l autoclave having been dried and purged with nitrogen were charged a catalyst containing the same slurry component [A] in an amount of 0.02 mmol per Ti as prepared in Example 1 and 0.2 mmol of triisobutylaluminum as the organometallic component [B] together with 2 l of purified n-hexane. While the inner temperature of the autoclave was being maintained at 80° C., hydrogen was pressured to 1.6 Kg/cm$^2$ and ethylene was added so that a total gauge pressure of 4.0 Kg/cm$^2$ could be achieved. Polymerization of ethylene was carried out for one hour while maintaining the total gauge pressure by supplying additional ethylene. As a result, 80 g of a white polymer was obtained.

EXAMPLE 21

(I) Synthesis of Hydrocarbon-soluble Organomagnesium Component (i)

In a 1 l flask having been purged with nitrogen were charged 69.5 g of di-n-butylmagnesium chloride and 9.73 g of triethylaluminum together with 500 ml of n-heptane, and the mixture was stirred at 80° C. for 2 hours to give an organomagnesium complex solution. As a result of analysis, the composition of this complex was AlMg$_{6.0}$($C_2H_5$)$_{3.0}$(n-$C_2H_9$)$_{12.0}$ and the concentration of the organometal was 1.25 mols per liter of the reaction solvent.

(II) SYNTHESIS OF SLURRY COMPONENT [A]

In a 1 l flask having been sufficiently dried was charged 500 mmols of a heptane solution containing trichlorosilane (HSiCl$_3$) in an amount of 1 mol per liter of n-heptane and then 500 mmols of the organomagnesium complex solution as obtained above was added dropwise thereto at 65° C. over one hour, and further the reaction was continued with stirring at 65° C. for one hour. To the reaction mixture was added 25 mmols of thiophene-2-carboxylic acid ethyl ester as a n-hexane solution containing 0.5 mol of thiophene-2-carboxylic acid ethyl ester per liter of n-hexane at 70° C. and the mixture was stirred at 70° C. for one hour and then 12.8 mmols of Ti(On-$C_3H_7$)$_4$ was added thereto and the reaction was conducted with stirring at 70° C. for one hour.

(III) SLURRY POLYMERIZATION OF PROPYLENE

In a 3 l autoclave having been sufficiently dried were charged the slurry component [A] as obtained above in an amount of 0.040 mg-atom per Ti and 0.2 mmol of triethylaluminum together with 0.8 l of n-hexane. While the inner temperature of the autoclave was being maintained at 60° C., propylene was pressurized to 5.0 Kg/cm$^2$ so that a total gauge pressure of 4.8 Kg/cm$^2$ could be achieved. Polymerization was carried out for two hours while maintaining the total gauge pressure by supplying additional ethylene. As a result, there were obtained 160 g of a n-hexane insoluble polymer and 13.6 g of a n-hexane soluble polymer and the catalyst efficiency was 83,500 g-PP/g-Ti and the residue after the n-hexane insoluble polymer was extracted with boiling n-heptane was 92.7% and its average particle diameter was about 60 mesh. The result of sieving is shown in TABLE 5.

TABLE 5

| Mesh | Weight % |
|---|---|
| 10 | 0 |
| 14 | 0.2 |
| 20 | 2.5 |
| 28 | 9.4 |
| 35 | 25.0 |
| 48 | 29.0 |
| 70 | 19.7 |
| 100 | 9.5 |
| 150 | 3.5 |
| 200 | 0.6 |
| 280 | 0 |
| >280 | 0 |

(IV) BULK POLYMERIZATION OF PROPYLENE

In an autoclave were charged the slurry component [A] as obtained above in an amount of 0.040 mg-atom per Ti, 0.2 mmol of triethylaluminum and 10 mmols of hydrogen and then 2 l of liquid propylene was introduced therein. Polymerization was conducted for two hours with stirring while the inner temperature of the autoclave was being maintained at 65° C. As a result, there was obtained 502 g of polypropylene powder and the n-heptane extraction residue was 93.9%.

EXAMPLES 22 TO 35

The same slurry polymerization as in Example 21 was repeated except that the catalyst obtained by employing the catalyst components as set forth in TABLES 6 and 7 in its preparation was used. The results are shown in TABLE 7.

TABLE 6

Slurry Catalyst Component [A]

Slurry Reaction Mixture (1)

| Example No. | Hydrocarbon Soluble Organomagnesium Component (i) (mmol) | Chlorosilane Compound (ii) (mmol) | (i) + (ii) Reaction Conditions Temperature (°C.) × Time (hour) |
|---|---|---|---|
| 22 | $AlMg_{6.0}(n-C_5H_{11})_{14.8}[N(C_2H_5)_2]_{0.2}$ 250 | $HSiCl_2(CH_3)$ 400 | 70 × 2 |
| 23 | $AlMg_{4.0}(n-C_4H_9)_7(On-C_6H_{13})_4$ 250 | $HSiCl_3$ 600 | 65 × 2 |
| 24 | $Al_2Mg(C_2H_5)_{7.7}(SC_6H_5)_{0.3}$ 250 | $HSiCl_3$ 500 | " |
| 25 | $(sec-C_6H_{13})_{1.7}Mg[OSiH(CH_3)_2]_{0.3}$ 250 | $HSiCl_2(C_2H_5)$ 500 | " |
| 26 | $(i-C_3H_7)Mg(n-C_4H_9)$ 250 | $HSiCl_2(n-C_3H_7)$ 500 | " |
| 27 | $(C_2H_5)_{0.8}Mg(n-C_4H_9)_{0.8}(OC_2H_5)_{0.4}$ 250 | $HSiCl_3$ 500 | " |
| 28 | $ZnMg_2(C_2H_5)_2(n-C_6H_{13})_4$ 250 | $HSiCl_2(CH_3)$ 500 | 70 × 2 |
| 29 | $BeMg(C_2H_5)_2(CH_2C_6H_5)_2$ 250 | $HSiCl_2(CH_3)$ 500 | " |
| 30 | $BMg_3(n-C_4H_9)_8[OSi(CH_3)(C_4H_9)]$ 250 | $HSiCl_3$ 600 | " |
| 31 | $LiMg_9(sec-C_4H_9)_9(n-C_4H_9)_{10}$ 250 | $HSiCl_3$ 500 | " |
| 32 | $AlMg_6(C_2H_5)_3(n-C_8H_{17})_{12}$ 250 | $HSiCl_3$ 500 | " |
| 33 | $(n-C_4H_9)Mg(sec-C_4H_9)$ 250 | $HSiCl_3$ 500 | 65 × 2 |
| 34 | $(n-C_4H_9)MgCl.(n-C_4H_9)_2O$ 250 | $HSiCl_2(CH_3)$ 500 | " |
| 35 | $(n-C_4H_9)MgCl$ (ether solution) 250 | $HSiCl_3$ 500 | " |

| Example No. | Titanium Compound (2) (mmol) | (1) + (2) Reaction Conditions Temperature (°C.) × Time (hour) | Heterocyclic Carboxylic Acid Ester (3) (mmol) | [(1) + (2)] (3) Reaction Conditions Temperature (°C.) × Time (hour) |
|---|---|---|---|---|
| 22 | $Ti(Oi-C_3H_7)_4$ 12.9 | 60 × 1 | Pyridine-3-carboxylic acid ethyl ester 30 | 60 × 1 |
| 23 | $Ti(On-C_3H_7)_4$ 12.5 | " | Pyridine-2-carboxylic acid methyl ester 30 | " |
| 24 | $Ti(On-C_5H_{11})_4$ 14.0 | " | Pyridine-4-carboxylic acid ethyl ester 30 | " |
| 25 | $Ti(On-C_4H_9)_4$ 10.8 | " | Pyrrol-2-carboxylic acid ethyl ester 25 | 65 × 1 |
| 26 | $Ti(On-C_4H_9)_4$ 15.5 | " | N—carboethoxy pyrrol 30 | " |
| 27 | $Ti(Osec-C_4H_9)_4$ 13.0 | " | Thiophene-2-carboxylic acid methyl ester 30 | " |
| 28 | $Ti(Ot-C_4H_9)_4$ 10.0 | " | Thiophene-2-carboxylic acid ethyl ester 24 | " |
| 29 | $Ti(On-C_4H_9)_4$ 11.4 | " | Thiophene-2-carboxylic acid n-butyl ester 25 | 60 × 1 |
| 30 | $Ti(Oi-C_3H_7)_4$ 13.5 | " | Thiophene-2-carboxylic acid ethyl ester 28 | 70 × 1 |
| 31 | $Ti(On-C_4H_9)_4$ 12.3 | " | Thiophene-3-carboxylic acid ethyl ester 29 | 60 × 1 |
| 32 | $Ti(OC_2H_5)_4$ + $Ti(On-C_4H_9)_4$ 8 + 5.6 | " | Thiophene-2-carboxylic acid ethyl ester 30 | 70 × 1 |
| 33 | $Ti(On-C_4H_9)_4$ 12.2 | " | Thiophene-2-carboxylic acid ethyl ester 30 | " |
| 34 | $Ti(On-C_4H_9)_4$ 15.7 | " | Thiophene-2-carboxylic acid ethyl ester 28 | " |
| 35 | $Ti(On-C_4H_9)$ 12.4 | " | Thiophene-2-carboxylic acid ethyl ester | " |

TABLE 6-continued

| Slurry Catalyst Component [A] |
|---|
| 24 |

TABLE 7

| | | Result of Polymerization | | | |
|---|---|---|---|---|---|
| | | n-Hexane Insoluble Polymer | | | |
| Example No. | Organo-metallic Component [B] (mmol) | Yield (g) | Boiling n-Heptane Extraction Residue (%) | Catalyst Efficiency (g-PP/g-Ti) | n-Hexane Soluble Polymer (g) |
| 22 | Al(C$_2$H$_5$)$_3$ 0.20 | 136 | 92.4 | 71,000 | 13.4 |
| 23 | Al(C$_2$H$_5$)$_3$ 0.20 | 144 | 90.6 | 75,200 | 14.2 |
| 24 | Al(C$_2$H$_5$)$_3$ 0.20 | 140 | 91.1 | 73,100 | 13.2 |
| 25 | Al(C$_2$H$_5$)$_3$ 0.20 | 144 | 91.8 | 75,200 | 13.0 |
| 26 | Al(C$_2$H$_5$)$_3$ 0.20 | 156 | 92.3 | 81,400 | 12.6 |
| 27 | Al(i-C$_4$H$_9$)$_3$ 0.20 | 162 | 92.0 | 84,600 | 12.0 |
| 28 | Al(i-C$_4$H$_9$)$_3$ 0.20 | 150 | 92.4 | 78,300 | 11.6 |
| 29 | Al(n-C$_3$H$_7$)$_3$ 0.20 | 130 | 92.1 | 67,800 | 12.9 |
| 30 | Al(C$_2$H$_5$)$_2$H Al(C$_2$H$_5$)$_3$ 0.1 + 0.1 | 126 | 90.8 | 65,800 | 10.5 |
| 31 | Al(C$_2$H$_5$)$_3$ 0.20 | 158 | 91.5 | 82,500 | 12.0 |
| 32 | Al(C$_2$H$_5$)$_3$ 0.20 | 168 | 93.1 | 87,700 | 10.2 |
| 33 | Al(C$_2$H$_5$)$_3$ 0.20 | 166 | 92.6 | 86,600 | 9.6 |
| 34 | Al(C$_2$H$_5$)$_3$ 0.20 | 160 | 92.5 | 83,500 | 7.0 |
| 35 | Al(C$_2$H$_5$)$_3$ 0.20 | 126 | 88.3 | 65,800 | 8.8 |

EXAMPLES 36 TO 39

Polymerization of the α-olefins as set forth in TABLE 8 was carried out by using the same catalyst as in Example 36 in the same manner as in Example 36. The results are shown in TABLE 8.

TABLE 8

| Example | | Polymer | |
|---|---|---|---|
| No. | α-Olefin | Yield (g) | Color |
| 36 | Butene-1 | 35 | white |
| 37 | 4-Methylpentene-1 | 31 | white |
| 38 | Propylene containing 2 mol % of ethylene | 165 | white |
| 39 | Propylene containing 2 mol % of butene-1 | 131 | white |

EXAMPLE 40

In a 1.5 l autoclave having been dried and purged with nitrogen were charged a catalyst containing the same slurry component [A] in an amount of 0.03 mg-atom per Ti as prepared in Example 21 and 0.2 mmol of triisobutylaluminum as the organometallic component [B] together with 0.8 l of purified n-hexane. While the inner temperature of the autoclave was being maintained at 80° C., hydrogen was pressured to 1.6 Kg/cm$^2$ and ethylene was added so that a total gauge pressure of 4.0 Kg/cm$^2$ could be achieved. Polymerization of ethylene was carried out for one hour while maintaining the total gauge pressure by supplying additional ethylene. As a result, 106 g of a white polymer was obtained.

EXAMPLE 41

(I) Synthesis of Hydrocarbon-soluble Organomagnesium Component (i)

In a 1 l flask having been purged with nitrogen were charged 68 g of di-n-butylmagnesium chloride and 9.4 g of triethylaluminum together with 500 ml of n-heptane, and the mixture was stirred at 80° C. for 2 hours to give an organomagnesium complex solution. As a result of analysis, the composition of this complex was AlMg$_{5.6}$(C$_2$H$_5$)$_{3.0}$(n-C$_2$H$_9$)$_{11.2}$ and the concentration of the organometal was 1.23 mols per liter of the reaction solvent.

(II) SYNTHESIS OF SLURRY COMPONENT [A]

In a 1 l flask having been sufficiently dried was charged 500 mmol of a heptane solution containing trichlorosilane (HSiCl$_3$) in an amount of 1 mol per liter of n-heptane, and then 250 mmols of the organomagnesium complex solution as obtained above and 100 ml of n-heptane were added dropwise thereto at 65° C. over one hour, and further the reaction was continued with stirring at 65° C. for one hour. To the reaction mixture was added 32 mmols of ethyl p-toluate as a n-hexane solution containing 1 mol of ethyl p-toluate per liter of n-hexane at 65° C. and the mixture was stirred at 70° C. for one hour, and then 15.0 mmols of TiCl$_4$ was added thereto and the reaction was conducted with stirring at 70° C. for one hour.

(III) SLURRY POLYMERIZATION OF PROPYLENE

In a 3 l autoclave having been sufficiently dried were charged the slurry component [A] as obtained above in an amount of 0.040 mg-atom per Ti and 0.2 mmol of triethylaluminum together with 1.6 l of n-hexane. While the inner temperature of the autoclave was being maintained at 60° C., propylene was pressurized to 5.0 Kg/cm$^2$ so that a total gauge pressure of 4.8 Kg/cm$^2$ could be achieved. Polymerization was carried out for two hours while maintaining the total gauge pressure by supplying additional ethylene. As a result, there were obtained 220 g of a n-hexane insoluble polymer and 9.2 g of a n-hexane soluble polymer and the catalyst efficiency was 115,000 g-PP/g-Ti and the residue after the n-hexane insoluble polymer was extracted with boiling n-heptane was 93.1% and its average particle diameter was about 40 mesh. The result of sieving is shown in TABLE 9.

TABLE 9

| Mesh | Weight % |
|---|---|
| 10 | 0 |
| 14 | 1.1 |
| 20 | 3.6 |
| 28 | 10.9 |
| 35 | 27.8 |
| 48 | 28.5 |
| 70 | 17.1 |
| 100 | 7.2 |
| 150 | 2.2 |
| 200 | 0.5 |

| Mesh | Weight % |
|---|---|
| 280 | 0 |
| >280 | 0 |

TABLE 9-continued

(IV) BULK POLYMERIZATION OF PROPYLENE

In an autoclave were charged the slurry component [A] as obtained above in an amount of 0.04 mg-atom per Ti, 0.2 mmol of triethylaluminum and 10 mmols of hydrogen and then 2 l of liquid propylene was introduced therein. Polymerization was conducted for two hours with stirring while the inner temperature of the autoclave was being maintained at 65° C. As a result, there was obtained 662 g of polypropylene powder and the n-heptane extraction residue was 94.4%.

EXAMPLES 42 TO 55

The same slurry polymerization as in Example 41 was repeated except that the catalyst obtained by employing the catalyst components as set forth in TABLES 10 and 11 in its preparation was used. The results are shown in TABLE 11.

TABLE 10

Slurry Catalyst Component [A]

Slurry Reaction Mixture (1)

| Example No. | Hydrocarbon Soluble Organomagnesium Component (i) (mmol) | Chlorosilane Compound (ii) (mmol) | (i) + (ii) Reaction Conditions Temperature (°C.) × Time (hour) |
|---|---|---|---|
| 42 | $AlMg_{6.0}(n-C_5H_{11})_{14.8}[N(C_2H_5)_2]_{0.2}$ 250 | $HSiCl_2(CH_3)$ 400 | 70 × 2 |
| 43 | $AlMg_{4.0}(n-C_4H_9)_7(On-C_6H_{13})_4$ 250 | $HSiCl_3$ 600 | 65 × 2 |
| 44 | $Al_2Mg(C_2H_5)_{7.7}(SC_6H_5)_{0.3}$ 250 | $HSiCl_3$ 350 | 60 × 2 |
| 45 | $(sec-C_6H_{13})_{1.7}Mg[OSiH(CH_3)_2]_{0.3}$ 250 | $HSiCl_2(C_2H_5)$ 400 | 70 × 2 |
| 46 | $(i-C_3H_7)Mg(n-C_4H_9)$ 250 | $HSiCl_2(n-C_3H_7)$ 400 | " |
| 47 | $(C_2H_5)_{0.8}Mg(n-C_4H_9)_{0.8}(OC_2H_5)_{0.4}$ 250 | $HSiCl_3$ 400 | 65 × 2 |
| 48 | $ZnMg_2(C_2H_5)_2(n-C_6H_{13})_4$ 250 | $HSiCl_2(CH_3)$ 450 | " |
| 49 | $BeMg(C_2H_5)_2(CH_2C_6H_5)_2$ 250 | $HSiCl_2(CH_3)$ 500 | 70 × 2 |
| 50 | $BMg_3(n-C_4H_9)_8[OSiH(CH_3)(C_4H_9)]$ 250 | $HSiCl_3$ 400 | 65 × 1 |
| 51 | $LiMg_9(sec-C_4H_9)_9(n-C_4H_9)_{10}$ 250 | $HSiCl_3$ 500 | " |
| 52 | $AlMg_6(C_2H_5)_3(n-C_8H_{17})_{12}$ 250 | $HSiCl_3$ 500 | " |
| 53 | $(n-C_4H_9)Mg(sec-C_4H_9)$ 250 | $HSiCl_3$ 500 | " |
| 54 | $(n-C_4H_9)MgCl.(n-C_4H_9)_2O$ 250 | $HSiCl_2(CH_3)$ 500 | " |
| 55 | $(n-C_4H_9)MgCl$ (ether solution) 250 | $HSiCl_3$ 500 | " |

| Example No. | Titanium Compound (2) (mmol) | (1) + (2) Reaction Conditions Temperature (°C.) × Time (hour) | Hydrocarbyl Carboxylic Acid Ester (3) (mmol) | [(1) + (2)] + (3) Reaction Conditions Temperature (°C.) × Time (hour) |
|---|---|---|---|---|
| 42 | $TiCl_4$ 11.6 | 65 × 1 | Methyl benzoate 28 | 70 × 1 |
| 43 | $TiCl_4$ 14.0 | " | n-Propyl benzoate 31 | " |
| 44 | $TiCl_4$ 16.8 | " | Ethyl p-toluate 34 | " |
| 45 | $TiCl_4$ 15.7 | " | Methyl anisate 30 | " |
| 46 | $TiCl_4$ 14.0 | 70 × 1 | Ethyl p-ethyl benzoate 32 | " |
| 47 | $TiCl_4$ 14.6 | " | Methyl p-ethyl benzoate 30 | " |
| 48 | $TiCl_4$ 12.7 | " | Methyl benzoate 20 | " |
| 49 | $TiCl_4$ 16.6 | 60 × 1 | Methyl p-toluate 37 | " |
| 50 | $TiCl_4$ 11.8 | " | Ethyl p-toluate 27 | " |
| 51 | $Ti(On-C_4H_9)Cl_3$ 12.5 | " | n-Propyl p-anisate 26 | " |
| 52 | $Ti(On-C_3H_7)_2Cl_2$ 13.3 | 70 × 1 | Ethyl anisate 30 | " |
| 53 | $Ti(On-C_4H_9)_3Cl$ 14.3 | " | Ethyl p-toluate 30 | " |
| 54 | $TiCl_4$ 14.0 | 60 × 1 | Methyl p-toluate 28 | " |

TABLE 10-continued

| | Slurry Catalyst Component [A] | | | |
|---|---|---|---|---|
| 55 | TiCl₄ 14.0 | " | Ethyl p-toluate 26 | " |

TABLE 11

| | | Result of Polymerization | | | |
|---|---|---|---|---|---|
| | | n-Hexane Insoluble Polymer | | | |
| Example No. | Organo-metallic Component [B](mmol) | Yield (g) | Boiling n-Heptane Extraction Residue (%) | Catalyst Efficiency (g-PP/g-Ti) | n-Hexane Soluble Polymer (g) |
| 42 | Al(C₂H₅)₃ 0.20 | 196 | 91.1 | 102,000 | 8.0 |
| 43 | Al(C₂H₅)₃ 0.20 | 210 | 92.2 | 110,000 | 8.6 |
| 44 | Al(C₂H₅)₃ 0.20 | 202 | 90.8 | 105,000 | 9.2 |
| 45 | Al(C₂H₅)₃ 0.20 | 212 | 91.5 | 111,000 | 8.6 |
| 46 | Al(C₂H₅)₃ 0.20 | 228 | 92.7 | 119,000 | 8.8 |
| 47 | Al(i-C₄H₉)₃ 0.20 | 206 | 90.5 | 108,000 | 8.6 |
| 48 | Al(i-C₄H₉)₃ 0.20 | 200 | 91.0 | 104,000 | 10.2 |
| 49 | Al(n-C₃H₇)₃ 0.20 | 206 | 90.8 | 108,000 | 7.2 |
| 50 | Al(C₂H₅)₂H Al(C₂H₅)₃ 0.1 + 0.1 | 204 | 91.1 | 106,000 | 7.6 |
| 51 | Al(C₂H₅)₃ 0.20 | 216 | 92.1 | 113,000 | 9.4 |
| 52 | Al(C₂H₅)₃ 0.20 | 224 | 90.3 | 117,000 | 9.6 |
| 53 | Al(C₂H₅)₃ 0.20 | 196 | 91.4 | 102,000 | 7.6 |
| 54 | Al(C₂H₅)₃ 0.20 | 208 | 92.3 | 109,000 | 7.8 |
| 55 | Al(C₂H₅)₃ 0.20 | 180 | 89.5 | 93,900 | 12.1 |

EXAMPLES 56 TO 59

Polymerization of the α-olefins as set forth in TABLE 12 was carried out by using the same catalyst as in Example 41 in the same manner as in Example 41. The results are shown in TABLE 12.

TABLE 12

| Example No. | α-Olefin | Polymer Yield (g) | Color |
|---|---|---|---|
| 56 | Butene-1 | 40 | white |
| 57 | 4-Methylpentene-1 | 32 | white |
| 58 | Propylene containing 2 mol % of ethylene | 116 | white |
| 59 | Propylene containing 2 mol % of butene-1 | 107 | white |

EXAMPLE 60

In a 3 l autoclave having been dried and purged with nitrogen were charged a catalyst containing the same slurry component [A] in an amount of 0.04 mg-atom per Ti as prepared in Example 41 and 0.2 mmol of triisobutylaluminum as the organometallic component [B] together with 2.0 l of purified n-hexane. While the inner temperature of the autoclave was being maintained at 80° C., hydrogen was pressured to 1.6 Kg/cm² and ethylene was added so that a total gauge presure of 4.0 Kg/cm² could be achieved. Polymerization of ethylene was carried out for one hour while maintaining the total gauge pressure by supplying additional ethylene. As a result, 90 g of a white polymer was obtained.

EXAMPLE 61

(I) Synthesis of Hydrocarbon-soluble Organomagnesium Component (i)

In a 1 l flask having been purged with nitrogen were charge 65 g of di-n-butylmagnesium chloride and 9.7 g of triethylaluminum together with 500 ml of n-heptane, and the mixture was stirred at 80° C. for 2 hours to give an organomagnesium complex solution. As a result of analysis, the composition of this complex was AlMg₅.₆(C₂H₅)₃.₀(n-C₂H₉)₁₁.₂ and the concentration of the organometal was 1.23 mol per liter of the reaction solvent.

(II) SYNTHESIS OF SLURRY COMPONENT [A]

In a 1 l flask having been sufficiently dried was charged 500 mmols of a heptane solution containing trichlorosilane (HSiCl₃) in an amount of 1 mol per liter of n-heptane and then 300 mmols of the organomagnesium complex solution as obtained above was added dropwise thereto at 70° C. over one hour, and further the reaction was continued with stirring at 70° C. for one hour. To the reaction mixture was added 26.5 mmols of ethyl p-toluate as a n-hexane solution containing 1 mol of ethyl p-toluate per liter of n-hexane at 70° C. and the mixture was stirred at 70° C. for one hour and then 12.0 mmols of Ti(On-C₃H₇)₄ was added thereto and the reaction was conducted with stirring at 70° C. for one hour.

(III) SLURRY POLYMERIZATION OF PROPYLENE

In a 3 l autoclave having been sufficiently dried were charged the slurry component [A] as obtained above in an amount of 0.040 mg-atom per Ti and 0.2 mmol of triethylaluminum together with 1.6 l of n-hexane. While the inner temperature of the autoclave was being maintained at 60° C., propylene was pressurized to 5.0 Kg/cm² so that a total gauge pressure of 4.8 Kg/cm² could be achieved. Polymerization was carried out for two hours while maintaining the total gauge pressure by supplying additional ethylene. As a result, there were obtained 148 g of a n-hexane insoluble polymer and 12.5 g of a n-hexane soluble polymer and the catalyst efficiency was 77,200 g-PP/g-Ti and the residue after the n-hexane insoluble polymer was extracted with boiling n-heptane was 92.5% and its average particle diameter was about 60 mesh. The result of sieving is shown in TABLE 13.

TABLE 13

| Mesh | Weight % |
|---|---|
| 10 | 0 |
| 14 | 0.6 |
| 20 | 3.0 |
| 28 | 9.0 |
| 35 | 25.0 |
| 48 | 30.0 |
| 70 | 21.0 |
| 100 | 8.4 |
| 150 | 3.1 |

TABLE 13-continued

| Mesh | Weight % |
|---|---|
| 200 | 0.3 |
| 280 | 0 |
| >280 | 0 |

(IV) BULK POLYMERIZATION OF PROPYLENE

In an autoclave were charged the slurry component [A] as obtained above in an amount of 0.04 mg-atom per Ti, 0.2 mmol of triethylaluminum and 10 mmols of hydrogen and then 2 l of liquid propylene was introduced therein. Polymerization was conducted for two hours with stirring while the inner temperature of the autoclave was being maintained at 65° C. As a result, there was obtained 474 g of polypropylene powder and the n-heptane extraction residue was 93.8%.

EXAMPLES 62 TO 75

The same slurry polymerization as in Example 61 was repeated except that the catalyst obtained by employing the catalyst components as set forth in TABLES 14 and 15 in its preparation was used. The results are shown in TABLE 15.

TABLE 14

| | Slurry Catalyst Component [A] | | |
|---|---|---|---|
| | Slurry Reaction Mixture (1) | | |
| Example No. | Hydrocarbon Soluble Organomagnesium Component (i) (mmol) | Chlorosilane Compound (ii) (mmol) | (i) + (ii) Reaction Conditions Temperature (°C.) × Time (hour) |
| 62 | AlMg$_{6.0}$(n-C$_5$H$_{11}$)$_{14.8}$[N(C$_2$H$_5$)$_2$]$_{0.2}$ 250 | HSiCl$_2$(CH$_3$) 450 | 70 × 1 |
| 63 | AlMg$_{4.0}$(n-C$_4$H$_9$)$_7$(On-C$_6$H$_{13}$)$_4$ 250 | HSiCl$_3$ 600 | 60 × 1 |
| 64 | Al$_2$Mg(C$_2$H$_5$)$_{7.7}$(SC$_6$H$_5$)$_{0.3}$ 250 | HSiCl$_3$ 500 | " |
| 65 | (sec-C$_6$H$_{13}$)$_{1.7}$Mg[OSiH(CH$_3$)$_2$]$_{0.3}$ 250 | HSiCl$_2$(C$_2$H$_5$) 500 | 70 × 1 |
| 66 | (i-C$_3$H$_7$)Mg(n-C$_4$H$_9$) 250 | HSiCl$_2$(n-C$_3$H$_7$) 500 | " |
| 67 | (C$_2$H$_5$)$_{0.8}$Mg(n-C$_4$H$_9$)$_{0.8}$(OC$_2$H$_5$)$_{0.4}$ 250 | HSiCl$_3$ 600 | " |
| 68 | ZnMg$_2$(C$_2$H$_5$)$_2$(n-C$_6$H$_{13}$)$_4$ 250 | HSiCl$_2$(CH$_3$) 500 | " |
| 69 | BeMg(C$_2$H$_5$)$_2$(CH$_2$C$_6$H$_5$)$_2$ 250 | HSiCl$_2$(CH$_3$) 500 | " |
| 70 | BMg$_3$(n-C$_4$H$_9$)$_8$[OSiH(CH$_3$)(C$_4$H$_9$)] 250 | HSiCl$_3$ 500 | 65 × 1 |
| 71 | LiMg$_9$(sec-C$_4$H$_9$)$_9$(n-C$_4$H$_9$)$_{10}$ 250 | HSiCl$_3$ 500 | " |
| 72 | AlMg$_6$(C$_2$H$_5$)$_3$(n-C$_8$H$_{17}$)$_{12}$ 250 | HSiCl$_3$ 500 | " |
| 73 | (n-C$_4$H$_9$)Mg(sec-C$_4$H$_9$) 250 | HSiCl$_3$ 500 | " |
| 74 | (n-C$_4$H$_9$)MgCl.(n-C$_4$H$_9$)nO 250 | HSiCl$_2$(CH$_3$) 500 | 70 × 1 |
| 75 | (n-C$_4$H$_9$)MgCl (ether solution) 250 | HSiCl$_3$ 500 | " |

| Example No. | Titanium Compound (2) (mmol) | (1) + (2) Reaction Conditions Temperature (°C.) × Time (hour) | Hydrocarbyl Carboxylic Acid Ester (3) (mmol) | [(1) + (2)] + (3) Reaction Conditions Temperature (°C.) × Time (hour) |
|---|---|---|---|---|
| 62 | Ti(On-C$_4$H$_9$)$_4$ 12.3 | 70 × 1 | Ethyl p-toluate 30 | 70 × 1 |
| 63 | Ti(Oi-C$_3$H$_7$)$_4$ 11.2 | " | Ethyl p-toluate 26 | " |
| 64 | Ti(On-C$_5$H$_{11}$)$_4$ 12.2 | " | Methyl anisate 26 | " |
| 65 | Ti(Osec-C$_4$H$_9$)$_4$ 11.5 | " | Ethyl p-ethyl benzoate 26 | " |
| 66 | Ti(Ot-C$_4$H$_9$)$_4$ 10.8 | " | Methyl p-ethyl benzoate 25 | " |
| 67 | Ti(On-C$_3$H$_7$)$_4$ 15.5 | " | Ethyl anisate 30 | " |
| 68 | Ti(Oi-C$_4$H$_9$)$_4$ 12.8 | " | n-Propyl benzoate 30 | " |
| 69 | Ti(On-C$_4$H$_9$)$_4$ 12.0 | " | n-Propyl p-toluate 30 | " |
| 70 | Ti(On-C$_4$H$_9$)$_4$ 14.1 | " | Ethyl p-toluate 30 | " |
| 71 | Ti(On-C$_4$H$_9$)$_4$ + Ti(OC$_2$H$_5$)$_4$ 8.1 + 5.0 | " | Ethyl benzoate 30 | " |
| 72 | Ti(Oi-C$_3$H$_7$)$_4$ 12.6 | " | Methyl benzoate 30 | " |
| 73 | Ti(On-C$_4$H$_9$)$_4$ 12.4 | " | n-Butyl benzoate 30 | " |
| 74 | Ti(On-C$_4$H$_9$)$_4$ | " | Methyl p-toluate | " |

TABLE 14-continued

| | | Slurry Catalyst Component [A] | | |
|---|---|---|---|---|
| 75 | 12.6<br>Ti(On-C$_4$H$_9$)$_4$<br>12.8 | " | 30<br>Ethyl p-toluate<br>30 | " |

TABLE 15

| | | Result of Polymerization | | |
|---|---|---|---|---|
| | | n-Hexane Insoluble Ploymer | | |
| Example No. | Organo-metallic Component [B] (mmol) | Yield (g) | Boiling n-Heptane Extraction Residue (%) | Catalyst Efficiency (g-PP/g-Ti) | n-Hexane Soluble Polymer (g) |
| 62 | Al(C$_2$H$_5$)$_3$ 0.20 | 132 | 91.5 | 68,900 | 11.5 |
| 63 | Al(C$_2$H$_5$)$_3$ 0.20 | 122 | 92.5 | 63,700 | 12.0 |
| 64 | Al(C$_2$H$_5$)$_3$ 0.20 | 126 | 91.1 | 65,800 | 12.0 |
| 65 | Al(C$_2$H$_5$)$_3$ 0.20 | 134 | 91.8 | 69,900 | 12.6 |
| 66 | Al(C$_2$H$_5$)$_3$ 0.20 | 140 | 92.5 | 73,100 | 13.0 |
| 67 | Al(i-C$_4$H$_9$)$_3$ 0.20 | 116 | 92.6 | 60,500 | 10.1 |
| 68 | Al(i-C$_4$H$_9$)$_3$ 0.20 | 130 | 91.5 | 67,800 | 11.8 |
| 69 | Al(n-C$_3$H$_7$)$_3$ 0.20 | 128 | 90.3 | 66,800 | 10.8 |
| 70 | Al(C$_2$H$_5$)$_2$H<br>Al(C$_2$H$_5$)$_3$<br>0.1 + 0.1 | 132 | 90.7 | 68,900 | 11.3 |
| 71 | Al(C$_2$H$_5$)$_3$ 0.20 | 144 | 91.8 | 75,200 | 12.2 |
| 72 | Al(C$_2$H$_5$)$_3$ 0.20 | 150 | 92.5 | 78,300 | 13.1 |
| 73 | Al(C$_2$H$_5$)$_3$ 0.20 | 156 | 91.1 | 81,400 | 13.2 |
| 74 | Al(C$_2$H$_5$)$_3$ 0.20 | 142 | 92.8 | 74,100 | 12.0 |
| 75 | Al(C$_2$H$_5$)$_3$ 0.20 | 114 | 88.5 | 59,500 | 11.7 |

EXAMPLES 76 TO 79

Polymerization of the α-olefins as set forth in TABLE 16 was carried out by using the same catalyst as in Example 61 in the same manner as in Example 61. The results are shown in TABLE 16.

TABLE 16

| Example No. | α-Olefin | Polymer Yield (g) | Color |
|---|---|---|---|
| 76 | Butene-1 | 34 | white |
| 77 | 4-Methylpentene-1 | 30 | white |
| 78 | Propylene containing 2 mol % of ethylene | 148 | white |
| 79 | Propylene containing 2 mol % of butene-1 | 140 | white |

EXAMPLE 80

In a 1.5 l autoclave having been dried and purged with nitrogen were charged a catalyst containing the same slurry component [A] in an amount of 0.04 mg-atom per Ti as prepared in Example 61 and 0.2 mmol of triisobutylaluminum as the organometallic component [B] together with 0.8 l of purified n-hexane. While the inner temperature of the autoclave was being maintained at 80° C., hydrogen was pressured to 1.6 Kg/cm$^2$ and ethylene was added so that a total gauge pressure 4.0 Kg/cm$^2$ could be achieved. Polymerization of ethylene was carried out for one hour while maintaining the total gauge pressure by supplying additional ethylene. As a result, 98 g of a white polymer was obtained.

EXAMPLE 81

Five grams of silica containing 99.5 percent by weight of SiO$_2$ and having a BET surface area of 300 m$^2$/g and a pore volume of 1.65 cc/g which had been dried at 200° C. in a nitrogen stream for four hours, 100 ml of n-hexane and 10 mmols of the same hydrocarbon-soluble organomagnesium component (i) as in Example 3 were charged in a flask and mixed at 60° C. for one to give a slurry. To this slurry was added dropwise 10 mmols of trichlorosilane as a n-hexane solution containing one mol of trichlorosilane per liter of n-hexane at 65° C. and the mixture was reacted at 65° C. for one hour. To the reaction mixture was added 31.6 mmols of thiophene-2-carboxylic acid ethyl ester as a n-hexane solution containing 1 mol of thiophene-2-carboxylic acid etyl ester per liter of n-hexane at 70° C. and the mixture was stirred at 70° C. for one hour and then 16.8 mmols of TiCl$_4$ was added thereto and the reaction was conducted with stirring at 70° C. for one hour to give a slurry component [A].

The same slurry polymerization of propylene as in Example 1 was repeated except that the slurry component [A] as obtained above was employed. As a result, there were obtained 260 g of a n-hexane insoluble polymer and 12.0 g of a n-hexane soluble polymer. The catalyst efficiency was 136,000 g-PP/g-Ti and the residue after the n-hexane insoluble polymer was extracted with boiling n-heptane was 93.4% and its average particle diameter was about 20 mesh.

EXAMPLE 82

The same preparation of the slurry component [A] as in Example 81 was repeated except that 8 mmols of AlMg$_6$(C$_2$H$_5$)$_3$(n-C$_4$H$_9$)$_{9.0}$[OSiH(CH$_3$)(n-C$_4$H$_9$)]$_{3.0}$ were employed as the hydrocarbon-soluble organomagnesium component (i) and that 16 mmols of dichloromethylsilane was reacted at 75° C. for one hour.

The same slurry polymerization of propylene as in Example 1 was repeated except that the slurry component [A] as obtained above was employed. As a result, there were obtained 270 g of a n-hexane insoluble polymer and 11.7 g of a n-hexane soluble polymer. The catalyst efficiency was 141,000 g-PP/g-Ti and the residue after the n-hexane insoluble polymer was extracted with boiling n-heptane was 94.5% and its average particle diameter was about 20 mesh.

EXAMPLE 83

The procedures of Example 82 were repeated except that 5 g of silica-alumina containing 86.0 percent by weight of SiO$_2$ and 13.0 percent by weight of Al$_2$O$_3$ having a BET surface area of 475 m$^2$/g and a pore volume of 1.10 l cc/g which had been dried at 200° C. in a nitrogen stream for four hours was employed in the preparation of the slurry component [A] instead of the 5 g of silica. As a result, there were obtained 250 g of a n-hexane insoluble polymer and 10.3 g of a n-hexane soluble polymer. The catalyst efficiency was 130,000 g-PP/g-Ti and the residue after the n-hexane insoluble polymer was extracted with boiling n-heptane was 94.6% and its average particle diameter was about 28 mesh.

It will be appreciated that instant specification and examples are set forth by way of illustration and not limitation, and that various modifications and changes may be made without departing from the spirit and scope of the present invention.

What is claimed is:

1. A process for polymerizing an α-olefin which comprises contacting the α-olefin at a temperature of about 10° C. to about 100° C. with a catalyst comprising a slurry component (A) and an organometallic component (B), the component (A) being obtained, without intermediate or final solids separation, by reacting (1) a slurry reaction mixture produced by reacting one mol of (i) a hydrocarbon-soluble organomagnesium component of the general formula

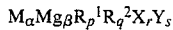
$M_\alpha Mg_\beta R_p^1 R_q^2 X_r Y_s$ wherein
α, p, q, r and s each independently is 0 or a number greater than 0,
β is a number greater than 1,
$p+q+r+s=m\alpha+2\beta$,
m is the valence of M,
M is a metal of the 1st to 3rd groups of the Periodic Table,
$R^1$ and $R^2$ each independently is a hydrocarbon group having 1 to 20 carbon atoms,
X and Y each independently is a hydrogen atom, a halogen atom, $OR^3$, $OSiR^4R^5R^6$, $NR^7R^8$ or $SR^9$ wherein $R^3$, $R^4$, $R^5$, $R^6$, $R^7$ and $R^8$ each independently is a hydrogen atom or a hydrocarbon group having 1 to 20 carbon atoms and $R^9$ is a hydrocarbon group having 1 to 20 carbon atoms,
or of the reaction product of $M_\alpha Mg_\beta R_p^1 R_q^2 X_r Y_s$ with at least one electron donor selected from the group consisting of ethers, thioethers, ketones, aldehydes, carboxylic acids or derivatives thereof, alcohols, thioalcohols and amines, with 0.1 to 10 mols of (ii) a chlorosilane compound of the formula

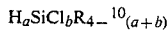
$H_a SiCl_b R_{4-(a+b)}^{10}$ wherein
$R^{10}$ is a hydrocarbon group having 1 to 20 carbon atoms,
$0 < a \leq 2$ and
b is a number greater than 1 at a temperature of about 20° C. to about 150° C.,
with (2) a titanium compound of the formula

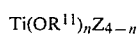
$Ti(OR^{11})_n Z_{4-n}$ wherein
$R^{11}$ is a hydrocarbon group having 1 to 20 carbon atoms,
Z is a halogen atom and
$0 \leq n \leq 4$,
and (3) a nitrogen- or sulfur-containing heterocyclic carboxylic acid ester or a hydrocarbyl carboxylic acid ester and the mol ratio of (2) the titanium compound/(3) the carboxylic acid ester being at least 0.3.

2. The process of claim 1, wherein M in the hydrocarbon-soluble organomagnesium component (i) of the slurry component [A] is lithium, beryllium, boron, aluminum or zinc metal.

3. The process of claim 2, wherein M in the hydrocarbon-soluble organomagnesium component (i) of the slurry component [A] is aluminum metal.

4. The process of claim 1, wherein α in the hydrocarbon-soluble organomagnesium component (i) in the slurry component [A] is a number greater than 0 and β/α is 0.5 to 10.

5. The process of claim 1, wherein the amount of $X_r$ and $X_s$ in the organomagnesium component (i) of the slurry component [A] is $0 \leq (r+s)/(\alpha+\beta) < 1$.

6. The process of claim 1, wherein the hydrocarbon-soluble organomagnesium component (i) in the slurry component [A] is a hydrocarbon-soluble organomagnesium component wherein α is zero and
(a) $R^1$ and $R^2$ both are alkyl groups having 4 to 6 carbon atoms and at least one of $R^1$ and $R^2$ is a secondary or tertiary alkyl group or
(b) $R^1$ is an alkyl group having 2 or 3 carbon atoms and $R^2$ is an alkyl group having at least 4 carbon atoms or
(c) $R^1$ and $R^2$ both are hydrocarbon groups having at least 6 carbon atoms.

7. The process of claim 1, wherein the chlorosilane compound (ii) in the slurry component [A] is a chlorosilane compound wherein $0.5 \leq a \leq 1.5$, $b > 1$ and $(a+b) \leq 4$.

8. The process of claim 7, wherein the chlorosilane compound (ii) is trichlorosilane.

9. The process of claim 7, wherein the chlorosilane compound (ii) is monomethyldichlorosilane.

10. The process of claim 1, wherein the reaction between (i) the hydrocarbon-soluble organomagnesium component or the reaction product of the hydrocarbon-soluble organomagnesium component with at least one electron donor and (ii) the chlorosilane compound is carried out in the presence of an inorganic oxide.

11. The process of claim 10, wherein the amount of the inorganic oxide is 10 g to 10 Kg per mol of the hydrocarbon-soluble organomagnesium component or the reaction product of the hydrocarbon-soluble organomagnesium component with at least one electron donor.

12. The process of claim 11, wherein the amount of the inorganic oxide is 20 g to 5 Kg per mol of the hydrocarbon-soluble organomagnesium component or the reaction product of the hydrocarbon-soluble organomagnesium component with at least one electron donor.

13. The process of claim 10, wherein the inorganic oxide is silica, silica-alumina, alumina or magnesia.

14. The process of claim 13, wherein the inorganic oxide is silica.

15. The process of claim 13, wherein the inorganic oxide is silica-alumina.

16. The process of claim 10, wherein (i) the hydrocarbon-soluble organomagnesium component or the reaction product of the hydrocarbon-soluble organomagnesium component with at least one electron donor contains $OR^3$.

17. The process of claim 10, wherein (i) the hydrocarbon-soluble organomagnesium component or the reaction product of the hydrocarbon-soluble organomagnesium component with at least one electron donor contains $OSiR^4R^5R^6$.

18. The process of claim 1, wherein n in the titanium compound (2) is 0.

19. The process of claim 18, wherein Z in the titanium compound (2) is chlorine.

20. The process of claim 19, wherein the titanium compound (2) is titanium tetrachloride.

21. The process of claim 1, wherein n in the titanium compound (2) is 4.

22. The process of claim 1, wherein the amount of the titanium compound (2) is $3 \leq Mg/Ti \leq 500$.

23. The process of claim 1, wherein the sulfur-containing heterocyclic carboxylic acid ester, the nitrogen-containing heterocyclic carboxylic acid ester or the hydrocarbyl carboxylic acid ester is the ester of a lower alkyl alcohol having 1 to 5 carbon atoms.

24. The process of claim 1, wherein the mol ratio of (2) the titanium compound/(3) the nitrogen- or sulfur-containing heterocyclic carboxylic acid ester or the hydrocarbyl carboxylic acid ester is 0.4 to 5.

25. The process of claim 1, wherein the electron donor is an ether, a thioether, a ketone, an aldehyde, a hydrocarbyl carboxylic acid or its derivative, an alcohol, a thioalcohol or an amine.

26. The process of claim 1, wherein the organometallic component [B] is an organoaluminum compound.

27. The process of claim 26, wherein the organoaluminum compound is a trialkylaluminum or a dialkylaluminum hydride.

28. The process of claim 1, wherein the mol ratio of M in the slurry component [A] plus the metal in the organometallic component [B] to Ti in the slurry component [A] is 3/1 to 1000/1.

29. The process of claim 1, wherein the α-olefin is at least one member selected from the group consisting of ethylene, propylene, butene-1, pentene-1, 4-methylpentene-1 and 3-methylbutene-1.

30. The process of claim 29, wherein the α-olefin is propylene.

31. A catalyst suitable for producing a poly-α-olefin which comprises a slurry component (A) and an organometallic component (B), the component (A) being obtained without intermediate or final solids separation, by reacting (1) a slurry reaction mixture produced by reacting one mol of (i) a hydrocarbon-soluble organomagnesium component of the general formula

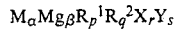

wherein

α, p, q, r and s each independently is 0 or a number greater than 0,

β is a number greater than 1, $p+q+r+s = m\alpha + 2\beta$, m is the valence of M, M is a metal of the 1st to 3rd groups of the Periodic Table, $R^1$ and $R^2$ each independently is a hydrocarbon group having 1 to 20 carbon atoms, X and Y each independently is a hydrogen atom, a halogen atom, $OR^3$, $OSiR^4R^5R^6$, $NR^7R^8$ or $SR^9$ wherein $R^3$, $R^4$, $R^5$, $R^6$, $R^7$ and $R^8$ each independently is a hydrogen atom or a hydrocarbon group having 1 to 20 carbon atoms and $R^9$ is a hydrocarbon group having 1 to 20 carbon atoms or of the reaction product of $M_\alpha Mg_\beta R_p^1 R_q^2 X_r Y_s$ with at least one electron donor selected from the group consisting of ethers, thioethers, ketones, aldehydes, carboxylic acids or derivatives thereof, alcohols, thioalcohols and amines, with 0.1 to 10 mols of (ii) a chlorosilane compound of the formula $$H_a SiCl_b R_{4-(a+b)}^{10}$$

wherein $R^{10}$ is a hydrocarbon group having 1 to 20 carbon atoms, $0 < a \leq 2$ and b is a number greater than 1 at a temperature of about 20° C. to about 150° C., with (2) a titanium compound of the formula

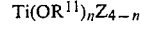

wherein $R^{11}$ is a hydrocarbon group having 1 to 20 carbon atoms,

Z is a halogen atom and $0 \leq n \leq 4$, and (3) a nitrogen- or sulfur-containing heterocyclic carboxylic acid ester or a hydrocarbyl carboxylic acid ester and the mol ratio of (2) the titanium compound/(3) the carboxylic acid ester being at least 0.3.

32. A process according to claim 1, in which (i) is $AlMg_{6.0}(C_2H_5)_{3.1}(n-OC_4H_9)_{11.9}$, (ii) is $HSiCl_3$, (2) is $TiCl_4$, (3) is thiophene-2-carboxylic acid ethyl ester, and (B) is triisobutylaluminum.

33. A process according to claim 1, in which (i) is $AlMg_{6.0}(C_2H_5)_{3.0}(n-C_4H_9)_{12.0}$, (ii) is $HSiCl_3$, (2) is $Ti(O-n-C_3H_7)_4$, (3) is thiophene-2-carboxylic acid ethyl ester, and (B) is triisobutylaluminum.

* * * * *